(12) United States Patent
Chen et al.

(10) Patent No.: US 11,792,423 B2
(45) Date of Patent: Oct. 17, 2023

(54) EARLY TERMINATION OF MOTION VECTOR REFINEMENT PROCESS IN VIDEO CODING

(71) Applicant: QUALCOMM Incorporated, San Diego, CA (US)

(72) Inventors: Chun-Chi Chen, San Diego, CA (US); Han Huang, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/952,736

(22) Filed: Nov. 19, 2020

(65) Prior Publication Data

US 2021/0160535 A1 May 27, 2021

Related U.S. Application Data

(60) Provisional application No. 62/939,325, filed on Nov. 22, 2019.

(51) Int. Cl.
*H04N 19/513* (2014.01)
*H04N 19/176* (2014.01)
(Continued)

(52) U.S. Cl.
CPC ......... *H04N 19/521* (2014.11); *H04N 19/176* (2014.11); *H04N 19/52* (2014.11); *H04N 19/577* (2014.11)

(58) Field of Classification Search
None
See application file for complete search history.

(56) References Cited

U.S. PATENT DOCUMENTS

2005/0100090 A1 5/2005 Kuo
2019/0020900 A1 1/2019 Chiang et al.
(Continued)

FOREIGN PATENT DOCUMENTS

EP 3547687 A2 10/2019
WO WO-2019225932 A1 * 11/2019

OTHER PUBLICATIONS

Chen, J. et al., "Algorithm description for Versatile Video Coding and Test Model 7 (VTM 7)", Joint Video Experts Team (JVET) of ITU-T SG 16 WP 3 and ISO/IEC JTC 1/SC 29/WG 11, Doc. No. JVET-P2002-v1 (Nov. 10, 2019) (Year: 2019).*

(Continued)

*Primary Examiner* — Lindsay J Uhl
(74) *Attorney, Agent, or Firm* — Shumaker & Sieffert, P.A.

(57) ABSTRACT

A video coder is configured to determine bi-directional motion vectors of a current block of the video data and determine that a condition is satisfied with respect to the current block based on each component of the bi-directional motion vectors of the current block being less than a threshold value. The video coder is further configured to, based on the condition being satisfied with respect to the current block, early terminate application of a motion vector refinement process to the bi-directional motion vectors of the current block. The video coder is further configured to determine a prediction block for the current block based on the bi-directional motion vectors of the current block and reconstruct the current block based on the prediction block for the current block.

26 Claims, 10 Drawing Sheets

(51) Int. Cl.
*H04N 19/577* (2014.01)
*H04N 19/52* (2014.01)

(56) References Cited

U.S. PATENT DOCUMENTS

| | | | | |
|---|---|---|---|---|
| 2020/0145650 | A1* | 5/2020 | Zhou | H04N 19/537 |
| 2020/0267408 | A1* | 8/2020 | Lee | H04N 19/105 |
| 2021/0029362 | A1* | 1/2021 | Liu | H04N 19/189 |
| 2021/0084325 | A1* | 3/2021 | Lim | H04N 19/105 |
| 2021/0136401 | A1* | 5/2021 | Liu | H04N 19/513 |
| 2021/0281870 | A1 | 9/2021 | Solovyev et al. | |
| 2021/0400299 | A1 | 12/2021 | Zhu et al. | |
| 2022/0046233 | A1* | 2/2022 | Unno | H04N 19/537 |

OTHER PUBLICATIONS

Chen C-C, (Qualcomm), et al., "Non-CE4: Early Termination of DMVR and Study of its Pixel Coverage", 17. JVET Meeting; Jan. 7, 2020-Jan. 17, 2020; Brussels; (The Joint Video Exploration Team of ISO/IEC JTC1/SC29/WG11 and ITU-T SG.16), No. JVET-Q0522, m52121, Jan. 1, 2020 (Jan. 1, 2020), XP030223819, 5 pages, Retrieved from the Internet: URL: http://phenix.int-evry.fr/jvet/doc_end_user/documents/17_Brussels/wg11/JVET-Q0522-v1.zip JVET-Q0522-v1.docx [retrieved on Jan. 1, 2020].

Chen J, et al., "Algorithm Description for Versatile Video Coding and Test Model 7 (VTM 7)", 16, JVET Meeting, Oct. 1, 2019-Oct. 11, 2019, Geneva, (The Joint Video Exploration Team of ISO/IEC JTC1/SC29/WG11 and ITU-T SG.16), No. JVET-P2002, m51516, Nov. 10, 2019 (Nov. 10, 2019), XP030224331, pp. 1-91, Retrieved from the Internet: URL: http://phenix.int-evry.fr/jvet/doc_end_user/documents/16_Geneva/wg11/JVET-P2002-v1.zip JVET-P2002-v1.docx [retrieved on Nov. 10, 2019].

International Search Report and Written Opinion—PCT/US2020/061588—ISA/EPO—dated Mar. 9, 2021.

Misra K, et al., "Description of SDR and HDR Video Coding Technology Proposal by Sharp and Foxconn", 10, JVET Meeting, Apr. 10, 2018-Apr. 20, 2018, San Diego, (The Joint Video Exploration Team of ISO/IEC JTC1/SC29/WG11 and ITU-T SG.16), No. JVET-J0026, Apr. 14, 2018 (Apr. 14, 2018), XP030248226, 70 pages, Retrieved from the Internet: URL: http://phenix.int-evry.fr/jvet/doc_end_user/documents/10_San%20Diego/wg11/JVET-J0026-v11.zip JVET-J0026-1.docx [retrieved on Apr. 14, 2018].

Bossen F., et al., "Guidelines for VVC Reference Software Development", Joint Video Experts Team (JVET) of ITU-T SG16 WP3 and ISO/IEC JTC1/SC29/WG11, 14th Meeting: Geneva, CH, Mar. 19-27, 2019, JVET-N1003, pp. 1-8.

Bross B., et al., "Versatile Video Coding (Draft 6)", 127th MPEG and 15th JVET Meeting, Jul. 3, 2019-Jul. 12, 2019, Gothenburg, (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages, Retrieved from the Internet: URL: http://phenix.int-evry.fr/mpeg/doc_end_user/documents/127_Gothenburg/wg11/m49908-JVET-O2001-v8-JVET-O2001-v8.zip.

Bross B., et al., "Versatile Video Coding (Draft 7)",'Joint Video Experts Team (JVET) of ITU-T SG 16 WP 3 and ISO/IEC JTC 1/SC 29/WG 11, JVET-P2001-vE, 16th Meeting, Geneva, CH, Oct. 1-11, 2019, 494 pages.

Chen C-C., et al., "Non-CE4: Early Termination of DMVR and Study of its Pixel Coverage", JVET-Q0522-v3, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-5.

Chen J., et al., "Algorithm Description for Versatile Video Coding and Test Model 4 (VTM 4)", 13th JVET Meeting, Jan. 9, 2019-Jan. 18, 2019, Marrakech, (The Joint Video Exploration Team of ISO/IEC JTC1/SC29/WG11 and ITU-T SG.16 WP3), No. JVET-M1002-v2, Mar. 19, 2019 (Mar. 19, 2019), XP030255391, pp. 1-62, Retrieved from the Internet: URL: http://phenix.int-evry.fr/jvet/doc_end_user/documents/13_Marrakech/wg11/JVET-M1002-v2.zip JVET-M1002-v2.docx [retrieved on Mar. 19, 2019] section 3.7 figure 1.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Sullivan G.J., et al., "Overview of the High Efficiency Video Coding (HEVC) Standard", IEEE Transactions on Circuits and Systems for Video Technology, vol. 22, No. 12, Dec. 2012, pp. 1649-1668.

* cited by examiner

EARLY TERMINATION OF MOTION VECTOR REFINEMENT PROCESS IN VIDEO CODING

This application claims the benefit of U.S. Provisional Patent Application 62/939,325, filed Nov. 22, 2019, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to early termination of a motion vector refinement process. The techniques of this disclosure may be applied to extensions of existing video codecs, such as high efficiency video coding (HEVC), versatile video coding (VVC), essential video coding (EVC), or be applied in any future video coding standards.

A motion vector refinement processes, such as, for example, bi-directional optical flow (BDOF) and decoder-side motion vector refinement (DMVR), are coding tools that may be used during video coding. For example, if the early termination conditions of a motion vector refinement process are satisfied, a video coder (e.g., a video encoder or a video decoder) may terminate the motion vector refinement process before the motion vector refinement process starts. Otherwise, if the early termination conditions for the motion vector refinement process are not satisfied, the video coder perform the motion vector refinement process.

One or more problems may exist relating to an application a motion vector refinement process where a video coder may apply the motion vector refinement process in cases where the motion vector refinement process adds a relatively large amount of complexity and a relatively low amount of prediction accuracy. This may increase the total complexity of the video coder, increase cost, and may slow down the coding process.

As described herein, a video coder (e.g., a video encoder or a video decoder) may determine whether a condition is satisfied with respect to the current block. For example, the video coder may determine that the condition is satisfied with respect to the current block based on each component of the bi-directional motion vectors of the current block being less than a threshold value. That is, the video coder may early terminate a motion vector refinement process based on whether an absolute value of the bi-directional motion vectors is small (i.e., less than a threshold) to help to avoid applying a motion vector refinement process in cases where the motion vector refinement process adds a relatively large amount of complexity and a relatively low amount of prediction accuracy. In this way, the video coder may early terminate an application of a motion vector refinement process to the bi-directional motion vectors of the current block, which may potentially reduce an average-case of decoder-side complexity.

In one example, a method of decoding video data includes determining bi-directional motion vectors of a current block of the video data and determining that a condition is satisfied with respect to the current block based on each component of the bi-directional motion vectors of the current block being less than a threshold value. The method further includes, based on the condition being satisfied with respect to the current block, early terminating application of a motion vector refinement process to the bi-directional motion vectors of the current block. The method further includes determining a prediction block for the current block based on the bi-directional motion vectors of the current block and reconstructing the current block based on the prediction block for the current block.

In another example, a device comprising a memory configured to store video data and one or more processors implemented in circuitry. The one or more processors are configured to determine bi-directional motion vectors of a current block of the video data and determine that a condition is satisfied with respect to the current block based on each component of the bi-directional motion vectors of the current block being less than a threshold value. The one or more processors are configured to, based on the condition being satisfied with respect to the current block, early terminate application of a motion vector refinement process to the bi-directional motion vectors of the current block. The one or more processors are configured to determine a prediction block for the current block based on the bi-directional motion vectors of the current block and reconstruct the current block based on the prediction block for the current block.

In one example, a computer-readable storage medium has stored thereon instructions that, when executed, cause a processor to determine bi-directional motion vectors of a current block of the video data and determine that a condition is satisfied with respect to the current block based on each component of the bi-directional motion vectors of the current block being less than a threshold value. The instructions further cause the processor to, based on the condition being satisfied with respect to the current block, early terminate application of a motion vector refinement process to the bi-directional motion vectors of the current block. The instructions further cause the processor to determine a prediction block for the current block based on the bi-directional motion vectors of the current block and reconstruct the current block based on the prediction block for the current block.

In one example, a device includes means for determining bi-directional motion vectors of a current block of the video data and means for determining that a condition is satisfied with respect to the current block based on each component of the bi-directional motion vectors of the current block being less than a threshold value. The device further includes means for early terminating application of a motion vector refinement process to the bi-directional motion vectors of the current block based on the condition being satisfied with respect to the current block. The device further includes means for determining a prediction block for the current block based on the bi-directional motion vectors of the current block and reconstruct the current block based on the prediction block for the current block.

The details of one or more examples are set forth in the accompanying drawings and the description below. Other features, objects, and advantages will be apparent from the description, drawings, and claims.

DETAILED DESCRIPTION

Figure 1:
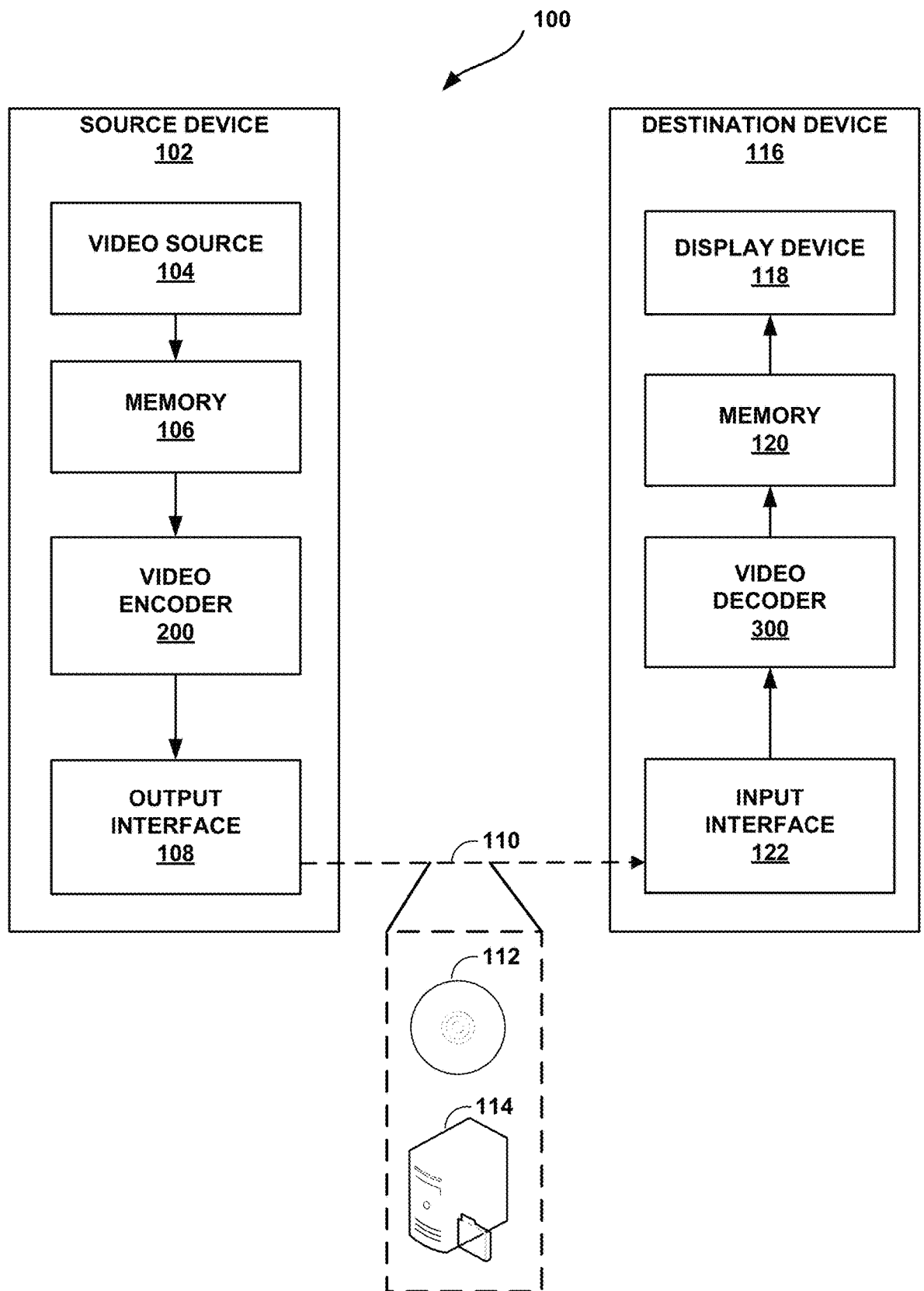
FIG. 1 is a block diagram illustrating an example video encoding and decoding system that may perform the techniques of this disclosure.

Motion vector refinement processes, such as, for example, bi-directional optical flow (BDOF) and decoder-side motion vector refinement (DMVR), are coding tools that may be used in a motion compensation process during video coding. For example, each of BDOF and DMVR may be associated with early termination conditions. If the early termination conditions of BDOF are satisfied, a video coder (e.g., a video encoder or a video decoder) may terminate a BDOF process before the BDOF process starts. Otherwise, if the early termination conditions for BDOF are not satisfied, the video coder perform the BDOF process. Similarly, if the early termination conditions for DMVR are satisfied, the video coder may terminate the DMVR process before the DMVR process starts. If the early termination conditions for DMVR are not satisfied, the video coder performs the DMVR process.

Bross, et al. "Versatile Video Coding (Draft 7)," Joint Video Experts Team (JVET) of ITU-T SG 16 WP 3 and ISO/IEC JTC 1/SC 29/WG 11, 16th Meeting: Geneva, CH, 1-11 Oct. 2019, JVET-P2001-v14 (hereinafter "VVC Draft 7") is a draft of the VVC standard. In VVC Draft 7, the early termination conditions for both BDOF and DMVR apply sum of absolute difference-based (SAD-based) early termination to reduce an average-case of decoder-side complexity. That is, one or more problems may exist relating to an application of BDOF and/or DMVR where a video coder may apply BDOF and/or DMVR in cases where BDOF and/or DMVR add a relatively large amount of complexity and a relatively low amount of prediction accuracy. This may increase the total complexity of the video coder, increase cost, and may slow down the coding process.

In accordance with the techniques of the disclosure, early termination techniques for BDOF and/or DMVR may be improved by considering whether the bi-directional motion vectors are symmetric (or nearly symmetric) or whether an absolute value of the bi-directional motion vectors is small (i.e., less than a threshold). This disclosure describes techniques that may provide a solution to one or more the above mentioned problems and/or one or more other problems. For instance, in one example, a video coder (e.g., a video encoder or a video decoder) may determine whether an early terminate condition is satisfied with respect to the current block. For example, the video coder may determine that the early terminate condition is satisfied with respect to the current block based on each component of the bi-directional motion vectors of the current block being less than a threshold value. In this way, the video coder may apply an early termination of an application of a motion vector refinement process to the bi-directional motion vectors of the current block based on whether the bi-directional motion vectors are symmetric (or nearly symmetric) and/or based on whether an absolute value of the bi-directional motion vectors is small, which may potentially reduce an average-case of decoder-side complexity with little or no loss in coding accuracy.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may include any of a wide range of devices, including desktop computers, mobile devices (e.g., notebook (i.e., laptop) computers, tablet computers, telephone handsets such as smartphones, cameras, etc.), set-top boxes, broadcast receiver devices, televisions, display devices, digital media players, video gaming consoles, video streaming devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply techniques related to DMVR and BDOF. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques related to DMVR and BDOF. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). VVC Draft 7 is a recent draft of the VVC standard. The techniques of this disclosure, however, are not limited to any particular coding standard. J. Chen et al., "Algorithm description of Versatile Video Coding and Test Model 4 (VTM 4)," Joint Video Experts Team (JVET) of ITU-T SG 16 WP 3 and ISO/IEC JTC 1/SC 29/WG 11, 15$^{th}$ Meeting: Marrakech, MA, 9-18 Jan. 2019, JVET-M1002, is an algorithm description and test model of VVC.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

In accordance with the techniques of the disclosure, video encoder 200 may determine whether a condition is satisfied with respect to the current block. For example, video encoder 200 may determine that the condition is satisfied with respect to the current block based on each component of the bi-directional motion vectors of the current block being less than a threshold value. Based on the condition being satisfied with respect to the current block, video encoder 200 may early terminate an application of a motion vector refinement process (e.g., DMVR and/or BDOF) to the bi-directional motion vectors of the current block. For example, video encoder 200 may refrain from initiating and/or bypass a motion vector refinement process (e.g., DMVR and/or BDOF) on the bi-directional motion vectors of the current block.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of the disclosure, video decoder 300 may determine whether a condition is satisfied with respect to the current block. For example, video decoder 300 may determine that the condition is satisfied with respect to the current block based on each component of the bi-directional motion vectors of the current block being less than a threshold value. Based on the condition being satisfied with respect to the current block, video decoder 300 may early terminate an application of a motion vector refinement process (e.g., DMVR and/or BDOF) to the bi-directional motion vectors of the current block. For example, video decoder 300 may refrain from initiating and/or bypass a motion vector refinement process (e.g., DMVR and/or BDOF) on the bi-directional motion vectors of the current block.

In HEVC, the largest coding unit in a slice is called a coding tree block (CTB) or coding tree unit (CTU). A CTB contains a quad-tree the nodes of which are coding units. The size of a CTB can range from 16×16 to 64×64 in the HEVC main profile (although technically 8×8 CTB sizes can be supported). A coding unit (CU) could be the same size of a CTB to as small as 8×8. Each coding unit is coded with one mode, e.g., inter or intra. When a CU is inter coded, the CU may be further partitioned into 2 or 4 prediction units (PUs) or become just one PU when further partition does not apply. When two PUs are present in one CU, they can be half size rectangles or two rectangle size with ¼ or ¾ size of the CU. When the CU is inter coded, each PU has one set of motion information, which is derived with a unique inter prediction mode.

In the HEVC standard, there are two inter prediction modes, named merge (skip is considered as a special case of merge) and advanced motion vector prediction (AMVP) modes, respectively, for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures used for the prediction of the current blocks, as well as the associated motion vectors are determined. On the other hand, under AMVP mode for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined. The candidates for both modes are derived similarly from the same spatial and temporal neighboring blocks.

Figure 2B:
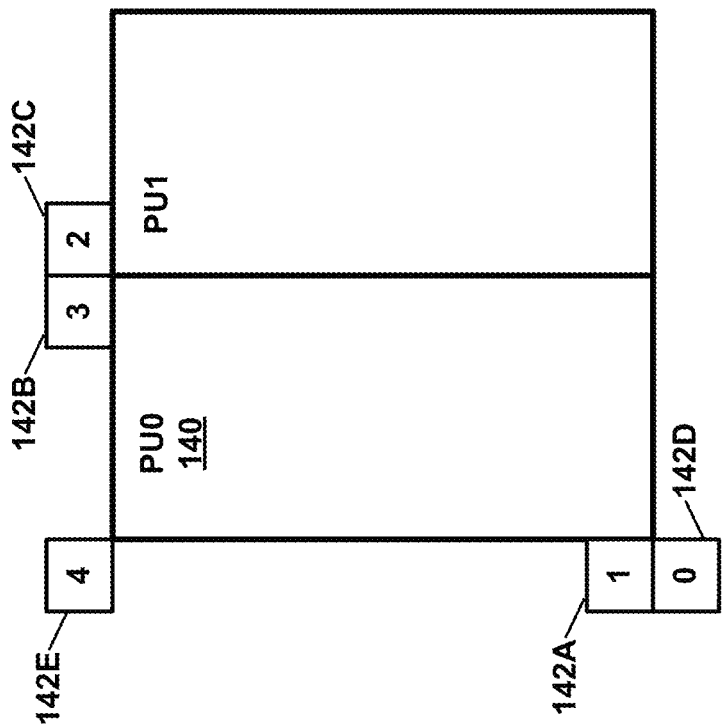
FIG. 2B is a conceptual diagram illustrating spatial neighboring MV candidates for AMVP mode.
Figure 2A:
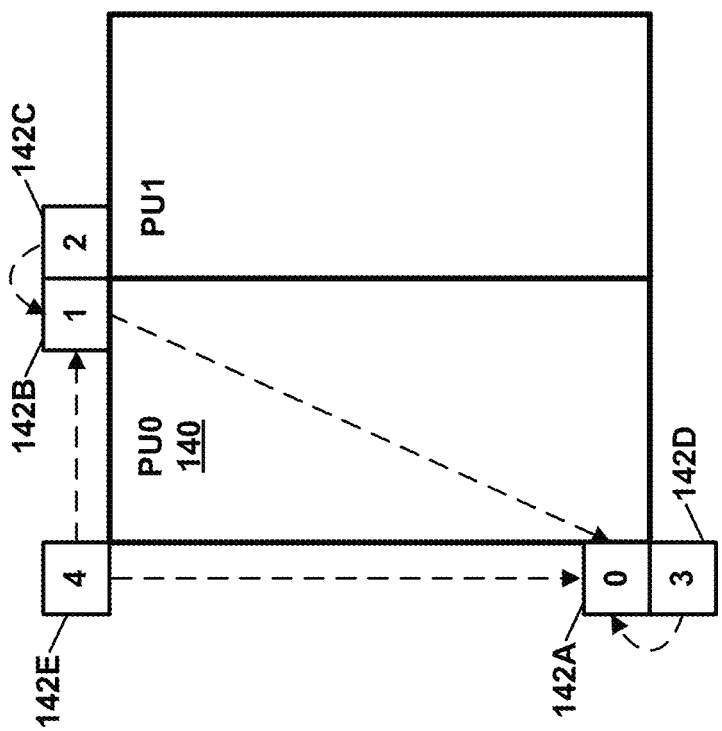
FIG. 2A is a conceptual diagram illustrating spatial neighboring motion vector (MV) candidates for merge mode.

Spatial MV candidates are derived from the neighboring blocks shown in FIG. 2A and FIG. 2B for a specific PU (PU$_0$) (140), although the methods generating the candidates from the blocks differ for merge and AMVP modes. FIG. 2A is a conceptual diagram illustrating spatial neighboring MV candidates for merge mode. FIG. 2B is a conceptual diagram illustrating spatial neighboring MV candidates for AMVP mode.

In merge mode, up to four spatial MV candidates can be derived with the orders shown in FIG. 2A with numbers, and the order is the following: left (0, A1), above (1, B1), above right (2, B0), below left (3, A0), and above left (4, B2), as shown in FIG. 2A.

In AMVP mode, the neighboring blocks 142A-142E are divided into two groups: a left group consisting of the block 0 and 1, and an above group consisting of the blocks 2, 3, and 4 as shown in FIG. 2B. For each group, the potential candidate in a neighboring block referring to the same reference picture as that indicated by the signaled reference index has the highest priority to be chosen to form a final candidate of the group. It is possible that none of the neighboring blocks contain a motion vector pointing to the same reference picture. Therefore, if such a candidate cannot be found, the first available candidate will be scaled to form the final candidate; thus the temporal distance differences can be compensated.

A temporal motion vector predictor (TMVP) candidate, if enabled and available, may be added into the MV candidate list after spatial motion vector candidates. The process of motion vector derivation for TMVP candidate is the same for both merge and AMVP modes; however, the target reference index for the TMVP candidate in the merge mode is always set to 0.

Figure 3B:
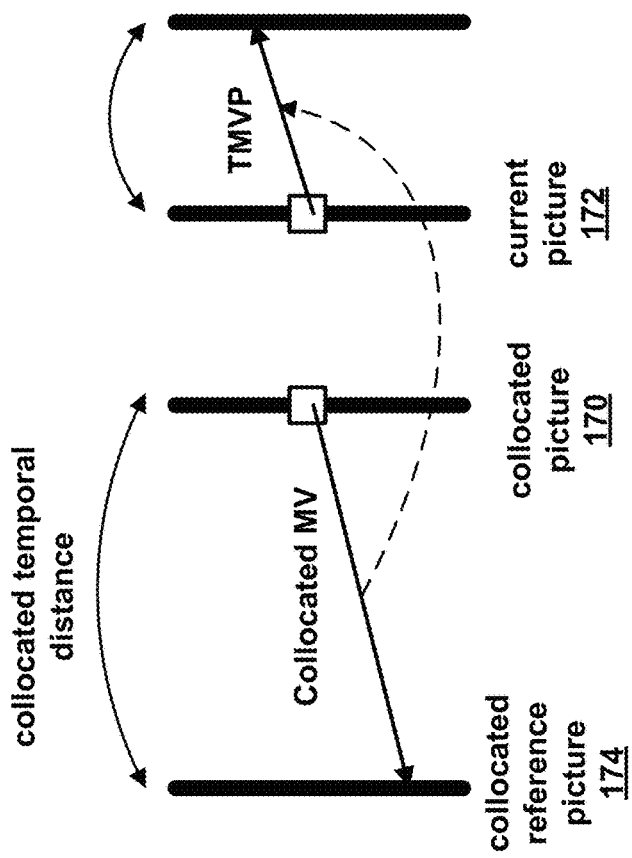
FIG. 3B is a conceptual diagram illustrating an example of MV scaling.
Figure 3A:
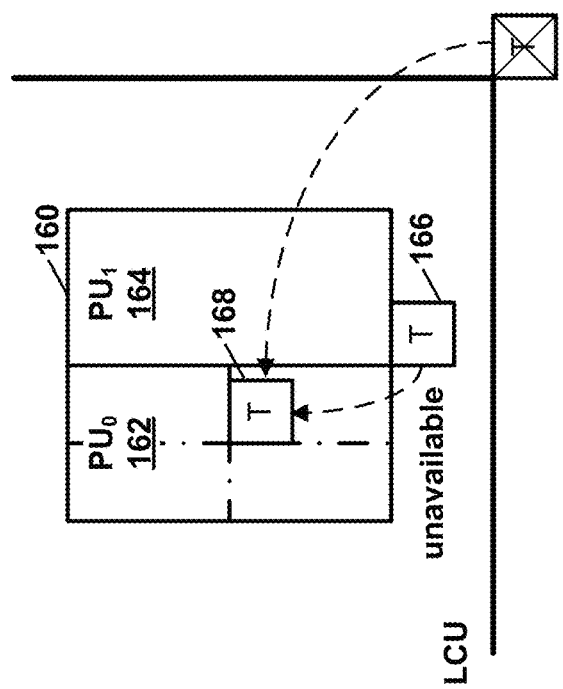
FIG. 3A is a conceptual diagram illustrating an example temporal motion vector predictor (TMVP) candidate.

The primary block location for TMVP candidate derivation is the bottom right block outside of the collocated PU as shown in FIG. 3A as a block "T", to compensate the bias to the above and left blocks used to generate spatial neighboring candidates. However, if that block is located outside of the current CTB row or motion information is not available, the block is substituted with a center block of the PU.

FIG. 3A is a conceptual diagram illustrating a TMVP candidate. In the example of FIG. 3A, a CU 160 includes a first PU 162 (denoted PU$_0$) and a second PU 164 (denoted PU$_1$). In the example of FIG. 3A, a primary block location 166 for TMVP candidate derivation is the bottom right block outside of the collocated PU (shown as a block "T"), to compensate for the bias to the above and left blocks used to generate spatial neighboring candidates. However, if the block at primary block location 166 is located outside of a current CTB row or motion information is not available, the block is substituted with a center block 168 of PU 602. A motion vector for a TMVP candidate is derived from the co-located PU of the co-located picture, indicated in the slice level. The motion vector for the co-located PU is called a collocated MV. Similar to temporal direct mode in H.264/AVC, to derive the TMVP candidate motion vector, the co-located MV may need to be scaled to compensate for the temporal distance differences, e.g., as shown in FIG. 3B.

FIG. 3B is a conceptual diagram illustrating MV scaling. In the example of FIG. 3B, a collocated picture 170 for a current picture 172 includes a motion vector (i.e., a collocated motion vector) that indicates a location in a collocated reference picture 174. A temporal distance between collocated picture 170 and collocated reference picture 174 is referred to as the collocated temporal distance. Furthermore, in AMVP, a reference index for a current block of current picture 172 indicates a current reference picture 176. A temporal distance between current picture 172 and current reference picture 176 is referred to as a current temporal distance. A video coder may use collocated motion vector as a temporal motion vector predictor (TMVP) of the block in current picture 172 but may scale the collocated motion vector based on a difference between the collocated temporal distance and the current temporal distance.

Thus, to determine a list 0 (L0) AMVP candidate list, the video coder may determine whether there is an available neighboring block in the left group that has a L0 motion vector. A neighboring block may be considered available if the neighboring block exists and the video coder is able to access motion information regarding the neighboring block. Furthermore, if the left group includes an available neighboring block that has a L0 motion vector, the video coder may include the L0 motion vector in the L0 AMVP candidate list. Additionally, the video coder may determine whether there is an available neighboring block in the above group that has a L0 motion vector. If the above group includes an available neighboring block that has a L0 motion vector, the video coder may include the L0 motion vector in the L0 AMVP candidate list. In some examples, if the left group and/or the above group includes no available L0 motion vectors, the video coder may include a L0 motion vector of a temporal neighbor. In some such examples, if the temporal neighbor is not available or does not have an L0 motion vector, the video coder may include a zero-valued motion vector in the L0 AMVP candidate list. The video coder may perform the same process with L0 replaced with L1 to determine a list 1 (L1) AMVP candidate list.

Several aspects of merge and AMVP modes are presented below.

Motion vector scaling: The value of a motion vector may be proportional to the distance of picture in the presentation time. As referred to herein, a motion vector associates two pictures, the reference picture, and the picture containing the motion vector (e.g., the containing picture). When a video coder (e.g., video encoder 200 or video decoder 300) uses a motion vector to predict the other motion vector, the video coder may calculate the distance of the containing picture and the reference picture based on the picture order count (POC) values.

For a motion vector to be predicted, a containing picture and reference picture associated with the motion vector may be different. Therefore, a video coder (e.g., video encoder 200 or video decoder 300) may calculate new distances (based on POC). The video coder may scale the motion vector based on these two POC distances. For a spatial neighboring candidate, the containing pictures for the two motion vectors are the same, while the reference pictures are different. When performing HEVC, the video coder may apply motion vector scaling to both TMVP and AMVP for spatial and temporal neighboring candidates.

Artificial motion vector candidate generation: If a motion vector candidate list is not complete, a video coder (e.g., video encoder 200 or video decoder 300) may generate artificial motion vector candidates and insert the artificial motion vector candidates at the end of the list until the MV candidate list has all candidates. In merge mode, there are two types of artificial MV candidates: (1) combined candidates derived only for B-slices and (2) zero candidates used only for AMVP if the first type does not provide enough artificial candidates.

For each pair of candidates that are already in the candidate list and have necessary motion information, a video coder (e.g., video encoder 200 or video decoder 300) may derive bi-directional combined motion vector candidates by a combination of the motion vector of the first candidate referring to a picture in the list 0 and the motion vector of a second candidate referring to a picture in the list 1.

Pruning process for candidate insertion: Candidates from different blocks may happen to be the same, which decreases the efficiency of a merge/AMVP candidate list. A video coder (e.g., video encoder 200 or video decoder 300) may apply a pruning process to help to prevent candidates from different blocks being the same. When applying the pruning process, the video coder may compare one candidate against the others in the current candidate list to avoid inserting identical candidate in certain extent. To reduce the complexity, the video coder may apply only limited numbers of pruning processes instead of comparing each potential one with all the other existing ones.

Decoder-side motion vector refinement (DMVR) is a variant of decoder-side MV derivation techniques that avoid the template-based refinement process. When applying DMVR, a video coder (e.g., video encoder 200 or video decoder 300) may compute a bilateral matching cost directly between the uni-prediction reference blocks (denoted as $I_0(x+v_0)$ and $I_1(x+v_1)$ and x as the coordinate of a pixel within the current block) pointed to by the initial bi-prediction MVs (e.g., vo and vi as in FIG. 4).

Figure 4:
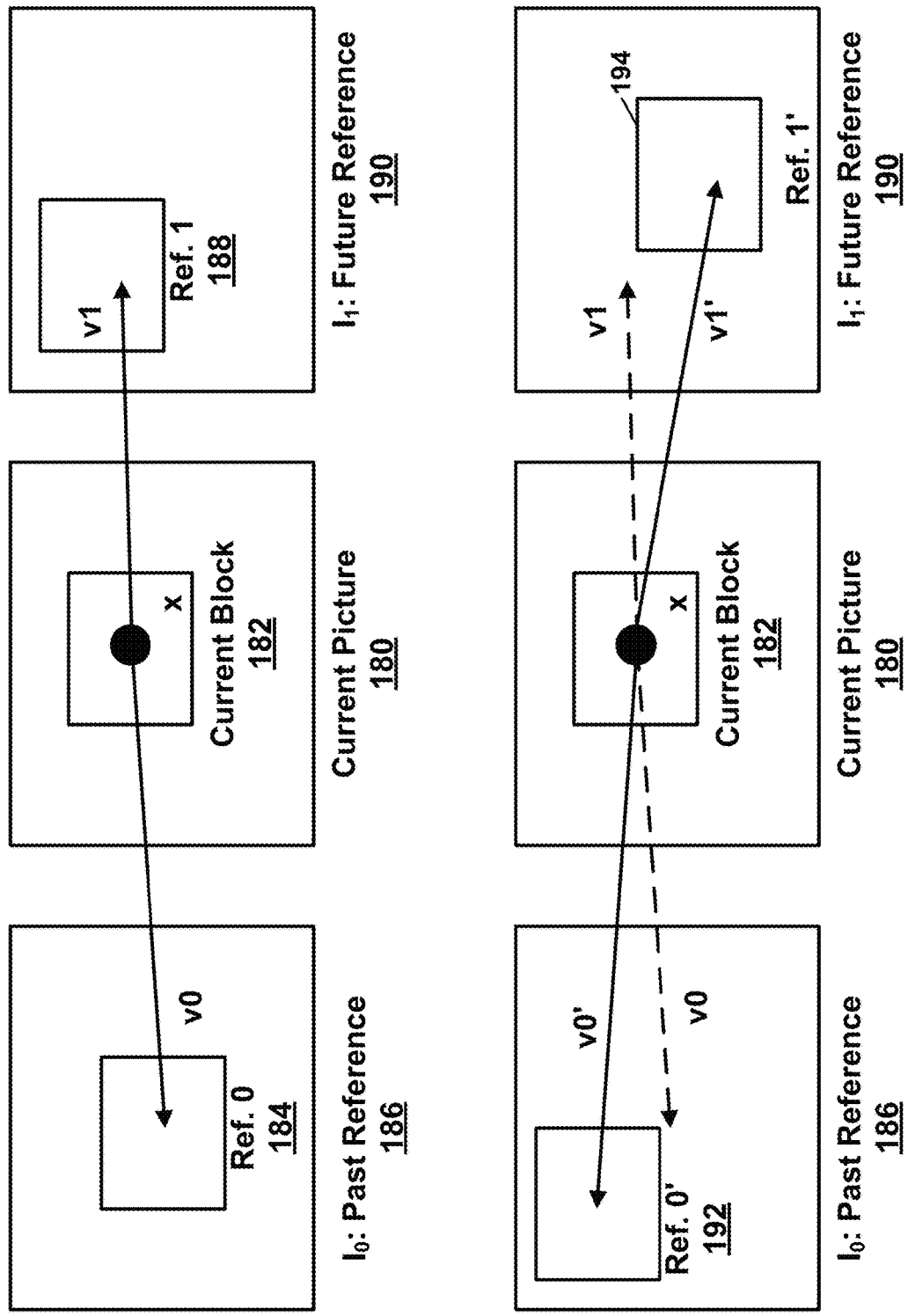
FIG. 4 is a conceptual diagram illustrating bilateral template matching.

FIG. 4 is a conceptual diagram that illustrates bilateral template matching. In the example of FIG. 4, a current picture 180 includes a current block 182. Current block 182 has an L0 motion vector that indicates a location corresponding to an area 184 (denoted Ref. 0) in a past reference picture 186. Current block 182 also has an L1 motion vector that indicates a location corresponding to an area 188 in a future reference picture 190. A video coder (e.g., a video encoder or a video decoder) performs a local search based on bilateral matching within a pre-defined 5×5 search range around the initial bi-prediction MVs. Following the raster-scanning order from the top-left of the 5×5 window, the DMVR process finds an optimal delta MV (i.e., Δ). The optimal delta MV is a delta MV that leads to the lowest bilateral matching cost, where the cost function is defined as the distortion between $I_0(x+v_0+\Delta)$ and $I_1(x+v_1-\Delta)$. A delta MV is a tuple that includes x and y values that are added to or subtracted from x and y values of the bi-prediction MVs. The optimal delta MV may be denoted by Δ*. The distortion function that is used in VVC Draft 7 is a sum of absolute Difference (SAD).

A video coder (e.g., video encoder 200 or video decoder 300) may then refine the output MV pair (denoted as $v_0+\Delta^*$ and $v_1-\Delta^*$, wherein Δ* is the optimized Δ within the pre-defined 5×5 window) again at sub-pel precision. The video coder may take the resulting MV pair to replace the original MVs ($v_0^{(0)}$ and $v_1^{(0)}$) of the merge block. The video coder may then perform motion compensation based on the refined MVs. Thus, in the example of FIG. 4, the video coder may determine areas 192 and 194 corresponding to locations Ref0' and Ref1' indicated by the refined MV pair.

In a test model for Bross, et al. "Versatile Video Coding (Draft 6)," Joint Video Experts Team (WET) of ITU-T SG 16 WP 3 and ISO/IEC JTC 1/SC 29/WG 11, 15th Meeting: Gothenburg, SE, 3-12 Jul. 2019, JVET-O2001-vE (hereinafter "VVC Draft 6") (VTM-6.0), a video coder (e.g., video encoder 200 or video decoder 300) may apply the DMVR process for a CU if each of the following conditions are satisfied:

CU level merge mode with bi-prediction MV.
One reference picture is in the past and another reference picture is in the future with respect to the current picture.
The distances (e.g., POC difference) from both reference pictures to the current picture are the same.
The CU is not coded using affine mode or the advanced temporal motion vector prediction (ATMVP) merge mode.
CU has more than 64 luma samples.
Both CU height and CU width are larger than or equal to 8 luma samples.
Bi-prediction with CU weights (BCW) weight index indicates equal weight.
Weighted prediction (WP) is not enabled for the current block, and
Combined inter and intra prediction (CIIP) mode is not used for the current block.

A video coder (e.g., video encoder 200 or video decoder 300) may use bi-directional optical flow (BDOF) to refine the bi-prediction signal of luma samples in a CU at the 4×4 sub-block level. As its name indicates, the BDOF mode is based on the optical flow concept, which assumes that the motion of an object is smooth. For each 4×4 sub-block, the video coder may calculate a motion refinement ($v_x$, $v_y$) by minimizing the difference between the L0 and L1 prediction samples. The video coder may use the motion refinement to adjust the bi-predicted sample values in the 4×4 sub-block. The video coder may apply the following steps in the BDOF process.

A video coder (e.g., video encoder 200 or video decoder 300) may compute the horizontal and vertical gradients, $$\frac{\partial I^{(k)}}{\partial x}(i,j) \text{ and } \frac{\partial I^{(k)}}{\partial y}(i,j),$$

k=0,1, of the two prediction signals by directly calculating the difference between two neighboring samples, e.g., $$\frac{\partial I^{(k)}}{\partial x}(i,j) = \left(I^{(k)}(i+1,j) - I^{(k)}(i-1,j)\right) >> \text{shift1}$$

$$\frac{\partial I^{(k)}}{\partial y}(i,j) = \left(I^{(k)}(i,j+1) - I^{(k)}(i,j-1)\right) >> \text{shift1}$$

where $I^{(k)}(i,j)$ are the sample value at coordinate (i,j) of the prediction signal in list k, k=0,1, and shift1 is calculated based on the luma bit depth, bitDepth, as shift1=max(2, 14-bitDepth).

A video coder (e.g., video encoder 200 or video decoder 300) may calculate the auto- and cross-correlation of the gradients, $S_1$, $S_2$, $S_3$, $S_5$ and $S_6$, as $$S_1 = \Sigma_{(i,j)\in\Omega}\psi_x(i,j)\cdot\psi_x d(i,j), S_3 = \Sigma_{(i,j)\in\Omega}\theta(i,j)\cdot\psi_x(i,j)$$

$$S_2 = \Sigma_{(i,j)\in\Omega}\psi_x(i,j)\cdot\psi_y(i,j)$$

$$S_5 = \Sigma_{(i,j)\in\Omega}\psi_y(i,j)\cdot\psi_y(i,j) S_6 = \Sigma_{(i,j)\in\Omega}\theta(i,j)\cdot\psi_y(i,j)$$

where $$\psi_x(i,j) = \left(\frac{\partial I^{(1)}}{\partial x}(i,j) + \frac{\partial I^{(0)}}{\partial x}(i,j)\right) >> n_a$$

$$\psi_y(i,j) = \left(\frac{\partial I^{(1)}}{\partial y}(i,j) + \frac{\partial I^{(0)}}{\partial y}(i,j)\right) >> n_a$$

$$\theta(i,j) = \left(I^{(1)}(i,j) >> n_b\right) - \left(I^{(0)}(i,j) >> n_b\right)$$

where $\Omega$ is a 6×6 window around the 4×4 sub-block, and the values of $n_a$ and $n_b$ are set equal to min(5, bitDepth-7) and min(8, bitDepth-4), respectively.

A video coder (e.g., video encoder 200 or video decoder 300) may derive the motion refinement ($v_x$, $v_y$) using the cross-correlation and auto-correlation terms using the following:

$$v_x = S_1 > 0?\text{clip3}(-th'_{BIO}, th'_{BIO}, -((S_3 \cdot 2^{n_b-n_a}) >> \lfloor\log_2 S_1\rfloor)):0$$

$$v_y = s_5 > 0?\text{clip3}(-th'_{BIO}, th'_{BIO}, -((s_6 \cdot 2^{n_b-n_a} - ((v_x s_{2,m})<<n_{s_2} + v_x s_{2,s})/2) >> \lfloor\log_2 s_5\rfloor)):0$$

where $$S_{2,M} = S_2 >> n_{S_2}, S_{2,s} = S_2 \& (2^{n_{S_2}} - 1), th'_{BIO} = 2^{13-BD}.$$

$\lfloor\cdot\rfloor$ is the floor function, and $n_{s_2}=12$.

Based on the motion refinement and the gradients, a video coder (e.g., video encoder 200 or video decoder 300) may calculate the following adjustment for each sample in the 4×4 sub-block:

$$b(x,y) = rnd\left(\left(v_x\left(\frac{\partial I^{(1)}(x,y)}{\partial x} - \frac{\partial I^{(0)}(x,y)}{\partial x}\right)\right)/2\right) + rnd\left(\left(v_y\left(\frac{\partial I^{(1)}(x,y)}{\partial y} - \frac{\partial I^{(0)}(x,y)}{\partial y}\right)\right)/2\right)$$

A video coder (e.g., video encoder 200 or video decoder 300) may calculate the BDOF samples of the CU by adjusting the bi-prediction samples as follows:

$$\text{pred}_{BDOF}(x,y) = (I^{(0)}(x,y) + I^{(1)}(x,y) + b(x,y) + o_{offset}) >> \text{shift}$$

A video coder (e.g., video encoder 200 or video decoder 300) may select these values such that the multipliers in the BDOF process do not exceed 15 bits, and the maximum bit-width of the intermediate parameters in the BDOF process is kept within 32 bits.

Figure 5:
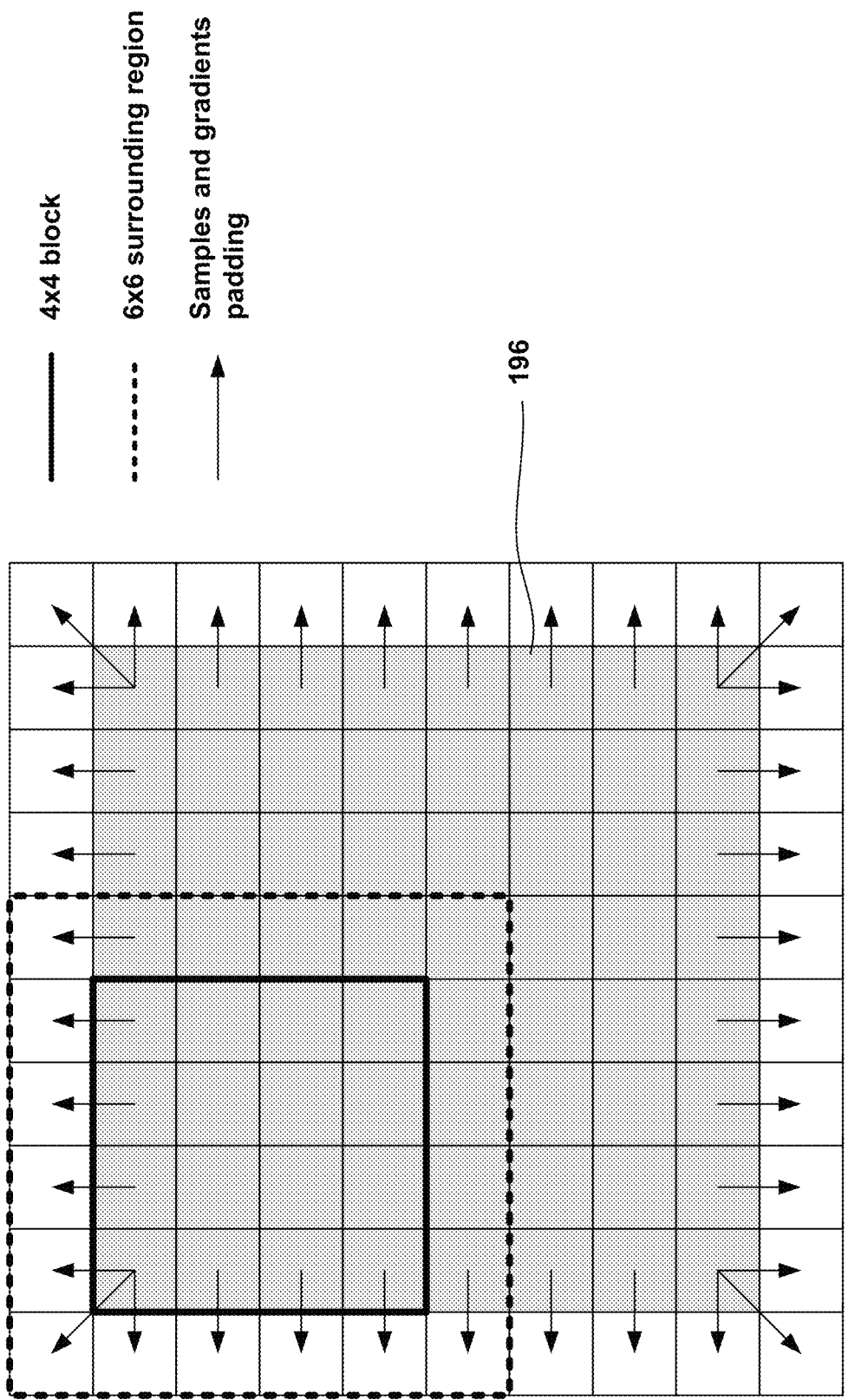
FIG. 5 is a conceptual diagram illustrating an example extended coding unit (CU) region used in bi-directional optical flow (BDOF).

In order to derive the gradient values, a video coder (e.g., video encoder 200 or video decoder 300) may generate some prediction samples $I^{(k)}(i,j)$ in list k (k=0,1) outside of the current CU boundaries. As depicted in FIG. 5, when performing BDOF, the video coder may use one extended row/column around the boundaries of a CU 196. In order to control the computational complexity of generating the out-of-boundary prediction samples, the video coder may generate prediction samples in the extended area (white positions) by taking the reference samples at the nearby integer positions (using floor( ) operation on the coordinates) directly without interpolation, and the normal 8-tap motion compensation interpolation filter is used to generate prediction samples within the CU (gray positions). The video coder may use these extended sample values in gradient calculations only. For the remaining steps in the BDOF process, if any sample and gradient values outside of the CU boundaries are needed, the video coder may pad (i.e., repeat) the sample and gradient values from their nearest neighbors.

A video coder (e.g., video encoder 200 or video decoder 300) may use BDOF to refine the bi-prediction signal of a CU at the 4×4 subblock level. The video coder may apply BDOF to a CU if it satisfies all the following conditions:
  The CU is coded using "true" bi-prediction mode, i.e., one of the two reference pictures is prior to the current picture in display order and the other is after the current picture in display order.
  The CU is not coded using affine mode or the ATMVP merge mode.
  CU has more than 64 luma samples.
  Both CU height and CU width are larger than or equal to 8 luma samples.
  BCW weight index indicates equal weight.
  WP is not enabled for the current CU.
  CIIP mode is not used for the current CU.

In VVC working draft 7, when performing both BDOF and DMVR., a video coder (e.g., video encoder 200 or video decoder 300) may apply SAD-based early termination to reduce average-case of decoder-side complexity. However, when applying SAD-based early termination, the video coder (e.g., video encoder 200 or video decoder 300) may apply BDOF and/or DMVR in cases where BDOF and/or DMVR add a relatively large amount of complexity and a relatively low amount of prediction accuracy. This may increase the total complexity of the video coder, increase cost, and may slow down the coding process.

As described herein, a video coder (e.g., video encoder 200 or video decoder 300) may determine whether a condition is satisfied with respect to the current block. For example, the video coder may early terminate DMVR with non-symmetric bi-directional motion vectors. In some examples where early termination for DMVR with non-symmetric bi-directional MVs is performed, the video coder may early terminate DMVR if the bi-directional motion vectors are not symmetric to each other. That is, the video coder may early terminate based on whether the bi-directional motion vectors are symmetric (or nearly symmetric) to help to avoid applying BDOF and/or DMVR in cases where BDOF and/or DMVR add a relatively large amount of complexity and a relatively low amount of prediction accuracy. In some examples, the video coder may early terminate based on whether an absolute value of the bi-directional motion vectors is small (i.e., less than a threshold) to help to avoid applying BDOF and/or DMVR in cases where BDOF and/or DMVR add a relatively large amount of complexity and a relatively low amount of prediction accuracy. In this way, the video coder may early terminate an application of a motion vector refinement process to the bi-directional motion vectors of the current block, which may potentially reduce an average-case of decoder-side complexity.

The following is a non-exclusive list of example conditions in which the video coder may early terminate DMVR in accordance with the techniques of this disclosure.

A video coder (e.g., video encoder 200 or video decoder 300) may early terminate a DMVR process if MVL0x≠−1*MVL1x and MVL0y−1*MVL1y. In this disclosure MVL0× denotes the x-component of a L0 motion vector, MVL0y denotes the y-component of a L0 motion vector, MVL1x denotes the x-component of a L1 motion vector, and MVL1y denotes the y-component of a L1 motion vector. Said differently, a video coder (e.g., video encoder 200 or video decoder 300) may determine that a condition (e.g., an early termination condition) is satisfied with respect to the current block based on MVL0x not being equal to −1*MVL1x and MVL0y not being equal to −1*MVL1y, where MVL0x is an x-component of a list 0 motion vector of the bi-directional motion vectors of the current block, MVL1x is an x-component of a list 1 motion vector of the bi-directional motion vectors of the current block, MVL0y is a y-component of the list 0 motion vector of the bi-directional motion vectors of the current block, and MVL1y is a y-component of the list 1 motion vector of the bi-directional motion vectors of the current block.

A video coder (e.g., video encoder 200 or video decoder 300) may early terminate a DMVR process if MVL0x≠−1*MVL1x or MVL0y≠−1*MVL1y. As one example, video coder (e.g., video encoder 200 or video decoder 300) may determine that a condition (e.g., an early termination condition) is satisfied with respect to the current block based on MVL0x not being equal to −1*MVL1x or MVL0y not being equal to −1*MVL1y, where MVL0x is an x-component of a list 0 motion vector of the bi-directional motion vectors of the current block, MVL1x is an x-component of a list 1 motion vector of the bi-directional motion vectors of the current block, MVL0y is a y-component of the list 0 motion vector of the bi-directional motion vectors of the current block, and MVL1y is a y-component of the list 1 motion vector of the bi-directional motion vectors of the current block.

A video coder (e.g., video encoder 200 or video decoder 300) may early terminate a DMVR process if MVL0x≠−1*(MVL1x+Δx) and MVL0y≠−1*(MVL1y+Δy) for all Δx and Δy ranging from −N to N, where N can be a sequence-, picture-, subpicture-, tile-, or slice-level number signaled in a bitstream or a pre-defined constant integer number. For example, Δx and Δy can be both 32 (that is 2 pixel in spatial distance if MV storage precision is 1/16-pel), so DMVR can be early-terminated if all of the Δx∈{−32, . . . , 32} and Δy∈{−32, . . . , 32} satisfy MVL0x≠−1*(MVL1x+Δx) and MVL0y≠−1*(MVL1y+Δy). Said differently, a video coder (e.g., video encoder 200 or video decoder 300) may determine that a condition (e.g., an early termination condition) is satisfied with respect to the current block based on MVL0x not being equal to −1*(MVL1x+Δx) and MVL0y not being equal to −1*(MVL1y+Δy) for all Δx and Δy ranging from −N to N, where MVL0x is an x-component of a list 0 motion vector of the bi-directional motion vectors of the current block, MVL1x is an x-component of a list 1 motion vector of the bi-directional motion vectors of the current block, MVL0y is a y-component of the list 0 motion vector of the bi-directional motion vectors of the current block, MVL1y is a y-component of the list 1 motion vector of the bi-directional motion vectors of the current block, and N is a sequence-, picture-, subpicture-, tile-, slice-level number signaled in a bitstream or a pre-defined constant integer number.

A video coder (e.g., video encoder 200 or video decoder 300) may early terminate a DMVR process if MVL0x≠−1*(MVL1x+Δx) or MVL0y≠−1*(MVL1y+Δy) for all Δx and Δy ranging from −N to N, where N can be a sequence-, picture-, subpicture-, tile-, slice-level number signaled in a bitstream or a pre-defined constant integer number. For example, Δx and Δy can be both 32 (that is 2 pixel in spatial distance if MV storage precision is 1/16-pel), so DMVR can be early-terminated if all of the Δx∈ {−32, . . . , 32} and Δy∈{−32, . . . , 32} satisfy MVL0x≠−1*(MVL1x+Δx) or MVL0y≠−1*(MVL1y+Δy). Said differently, a video coder (e.g., video encoder 200 or video decoder 300) may determine that a condition (e.g., an early termination condition) is satisfied with respect to the current block based on MVL0x not being equal to −1*(MVL1x+Δx) or MVL0y not being equal to −1*(MVL1y+Δy) for all Δx and Δy ranging from −N to N, where MVL0x is an x-component of a list 0 motion vector of the bi-directional motion vectors of the current block, MVL1x is an x-component of a list 1 motion vector of the bi-directional motion vectors of the current block, MVL0y is a y-component of the list 0 motion vector of the bi-directional motion vectors of the current block, MVL1y is a y-component of the list 1 motion vector of the bi-directional motion vectors of the current block, and N is a sequence-, picture-, subpicture-, tile-, slice-level number signaled in a bitstream or a pre-defined constant integer number.

A video coder (e.g., video encoder 200 or video decoder 300) may early terminate a DMVR process if the length of MVs are different from each other. The definition of the said length is the p-norm of the motion vector where p can be any non-negative integer number. Said differently, a video coder (e.g., video encoder 200 or video decoder 300) may determine that a condition (e.g., an early termination condition) is satisfied with respect to the current block based on the length of the bi-directional motion vectors of the current block being different from each other. However, based on the condition not being satisfied with respect to a second current block, the video coder may apply the motion vector refinement process to bi-directional motion vectors of the second block to determine refined bi-directional motion vectors of the second block and determine a prediction block for the second block based on the refined bi-directional motion vectors of the second block.

A video coder (e.g., video encoder 200 or video decoder 300) may early terminate a DMVR process if the p-norm of MVs are quite different from each other. Specifically, if the absolute difference between the respective p-norm of the bi-directional MVs falls beyond a given threshold N (either predefined or signaled at sequence, picture, subpicture, tile, slice or CTU level), then DMVR can be early terminated. Said differently, a video coder (e.g., video encoder 200 or video decoder 300) may determine that a condition (e.g., an early termination condition) is satisfied with respect to the current block based on a difference between p-norms (e.g., a length) of the bi-directional motion vectors of the current block being greater than a threshold.

A video coder (e.g., video encoder 200 or video decoder 300) may early terminate a DMVR process if the p-norm of MVs are not quite different from each other. Specifically, if the absolute difference between the respective p-norm of the bi-directional MVs falls within a given threshold N (either predefined or signaled at sequence, picture, subpicture, tile, slice or CTU level), then DMVR can be early terminated. Said differently, a video coder (e.g., video encoder 200 or video decoder 300) may determine that a condition (e.g., an early termination condition) is satisfied with respect to the current block based on a difference between p-norms (e.g., a length) of the bi-directional motion vectors of the current block being less than a threshold.

It is noted that in some embodiments, a video coder (e.g., video encoder 200 or video decoder 300) may apply the aforementioned early-termination techniques for the DMVR process to early-terminate a BDOF process.

In some examples of this disclosure, a video coder (e.g., video encoder 200 or video decoder 300) may perform early termination for DMVR with small bi-directional MVs. For instance, the video coder may early terminate DMVR if an absolute value of each component (i.e., MVx and MVy) of the given bi-directional MVs are smaller than a given threshold value, N, where N is an integer number that can be pre-defined (e.g. 1, 2, 3, 4, . . . ) or signaled as a sequence-, picture-, subpicture-, tile-, slice- or CTU-level syntax element. Specifically, with a N, the video coder may terminate a DMVR process before the DMVR process starts during the motion-compensation stage, if |MVL0x|<N, |MVL0y|<N, |MVL1x|<N and |MVL1y|<N. For example, N can be set equal to 4, so DMVR is early-terminated if |MVL0x|<4, |MVL0y|<4, |MVL1x|<4 and |MVL1y|<4. In another example, N can be set equal to 1, so DMVR can be early-terminated before its refinement process starts during motion compensation if MVL0x=0, MVL0y=0, MVL1x=0 and MVL1y=0. Said differently, a video coder (e.g., video encoder 200 or video decoder 300) may determine that a condition (e.g., an early termination condition) is satisfied with respect to the current block based on each component of the bi-directional motion vectors of the current block being less than a threshold value.

It is noted that in some examples, the same early-termination method can be applied to BDOF to early-terminate itself.

Thus, in accordance with examples of this disclosure, a video coder (e.g., video encoder 200 or video decoder 300) may determine bi-directional motion vectors of a current block of the video data and determine whether a condition is satisfied with respect to the current block. The video coder may, based on the condition being satisfied with respect to the current block, early terminate application of a motion vector refinement process to the bi-directional motion vectors of the current block and determine a prediction block for the current block based on the bi-directional motion vectors of the current block. The video coder may perform at least one of: reconstructing the current block based on the prediction block for the current block, or generating residual data for the current block based on the prediction block for the current block.

In some examples of this disclosure, a video coder (e.g., video encoder 200 or video decoder 300) may use a constrained MV refinement. In such examples, the video coder may refine only one of the bi-directional MVs while keeping the other MV unchanged. For example, the video coder may determine a first motion vector of a current block of the video data and a second motion vector of the current block. The video coder may determine a selected motion vector from among the first motion vector and the second motion vector. The video coder may generate a refined version of the selected motion vector by applying a motion vector refinement process to the selected motion vector. The video coder may determine a prediction block for the current block based on the refined version of the selected motion vector and whichever of the first and second motion vectors is not the selected initial motion vector. The video coder may perform at least one of reconstructing the current block based on the prediction block for the current block or generating residual data for the current block based on the prediction block for the current block.

When performing DMVR, video encoder 200 may specify whether MVL0 or MVL1 is to be refined and keep the other unchanged. Video encoder 200 may indicate which of the two MVs to be refined by using a sequence-, picture-, subpicture-, tile-, slice-, CTU- or CU-level flag. Said differently, a video encoder (e.g., video encoder 200) may include, in a bitstream that includes an encoded representation of the video data, one or more syntax elements that of the first motion vector of the current block or the second motion vector of the current block is the selected motion vector. In some examples, a video decoder (e.g., video decoder 300) may determine, based on one or more syntax signaled in a bitstream that includes an encoded representation of the video data, which one of the first motion vector of the current block or the second motion vector of the current block is the selected motion vector.

When applying DMVR, a video coder (e.g., video encoder 200 or video decoder 300) may determine which of MVL0 and MVL1 is the one to be refined based on the length of motion vector. Said differently, a video coder (e.g., video encoder 200 or video decoder 300) may determine a selected motion vector based on lengths of the first motion vector of the current block and the second motion vector of the current block. The definition of the said length is the p-norm (e.g., length) of the motion vector where p can be any non-negative integer number. In some examples, the video coder may refine the MV with a longer length while keeping the other one unchanged. In another examples, the video coder may refine the MV with a shorter length while keeping the other one unchanged.

When applying DMVR, a video coder (e.g., video encoder 200 or video decoder 300) may determine which of MVL0 and MVL1 is the one to be refined based on their symmetry. Said differently, the video coder may determine the selected motion vector includes determining the selected motion vector based on symmetry of the first motion vector of the current block and the second motion vector of the current block.

When both of the bi-directional MVs are not symmetric to each other (e.g., MVL0 is not equal to −1*MVL1), a video coder (e.g., video encoder 200 or video decoder 300) may refine the MV with a shorter (or larger in another embodiments) length while keeping the other unchanged; otherwise if MVL0 is equal to −1*MVL1, both MVs are refined. Said differently, the video coder may, based on a first motion vector of a current block and a second motion vector of the current block not being symmetric to one another, select whichever of the first motion vector of the current block and the second motion vector of the current block is shorter as the selected motion vector.

When applying DMVR, a video coder (e.g., video encoder 200 or video decoder 300) may determine which of MVL0 and MVL1 is the one to be refined based on their symmetry. Said differently, the video coder may make a determination, based on the first motion vector of the current block and the second motion vector of the current block being symmetric, to determine the selected motion vector. When both of the bi-directional MVs are not quite symmetric to each other, the video coder may refine the MV with a shorter (or larger in another embodiments) length while keeping the other unchanged; otherwise, both MVs are refined. When applying DMVR, the video coder may determine whether both of the bi-directional MVs are not quite symmetric to each other based on MVL0≠−1*(MVL1+(Δx, Δy)) for all Δx and Δy ranging from −N to N, where N can be a sequence-, picture-, subpicture-, tile-, slice-level number signaled in a bitstream or a pre-defined constant integer number. Said differently, the video coder may make a determination, based on MVL0≠−1*(MVL1+(Δx,Δy)) for all Δx and Δy ranging from −N to N, to determine the selected motion vector, where N is a sequence-, picture-, subpicture-, tile-, slice-level number signaled in a bitstream or a pre-defined constant integer number.

It is noted that in some examples of this disclosure, a video coder (e.g., video encoder 200 or video decoder 300) may apply the same early-termination a BDOF process and/or to select one of the MVs to refine.

Thus, in accordance with one or more examples of this disclosure, a video coder (e.g., video encoder 200 or video decoder 300) may determine bi-directional motion vectors of a current block of the video data. The video coder may determine whether a condition is satisfied with respect to the current block. For example, the video coder may determine that the condition is satisfied with respect to the current block based on each component of the bi-directional motion vectors of the current block being less than a threshold value. The video coder may, based on the condition being satisfied with respect to the current block, early terminate application of a motion vector refinement process to the bi-directional motion vectors of the current block. The video coder may determine a prediction block for the current block based on the bi-directional motion vectors of the current block. The video coder may reconstruct the current block based on the prediction block for the current block and/or generate residual data for the current block based on the prediction block for the current block.

Figure 6:
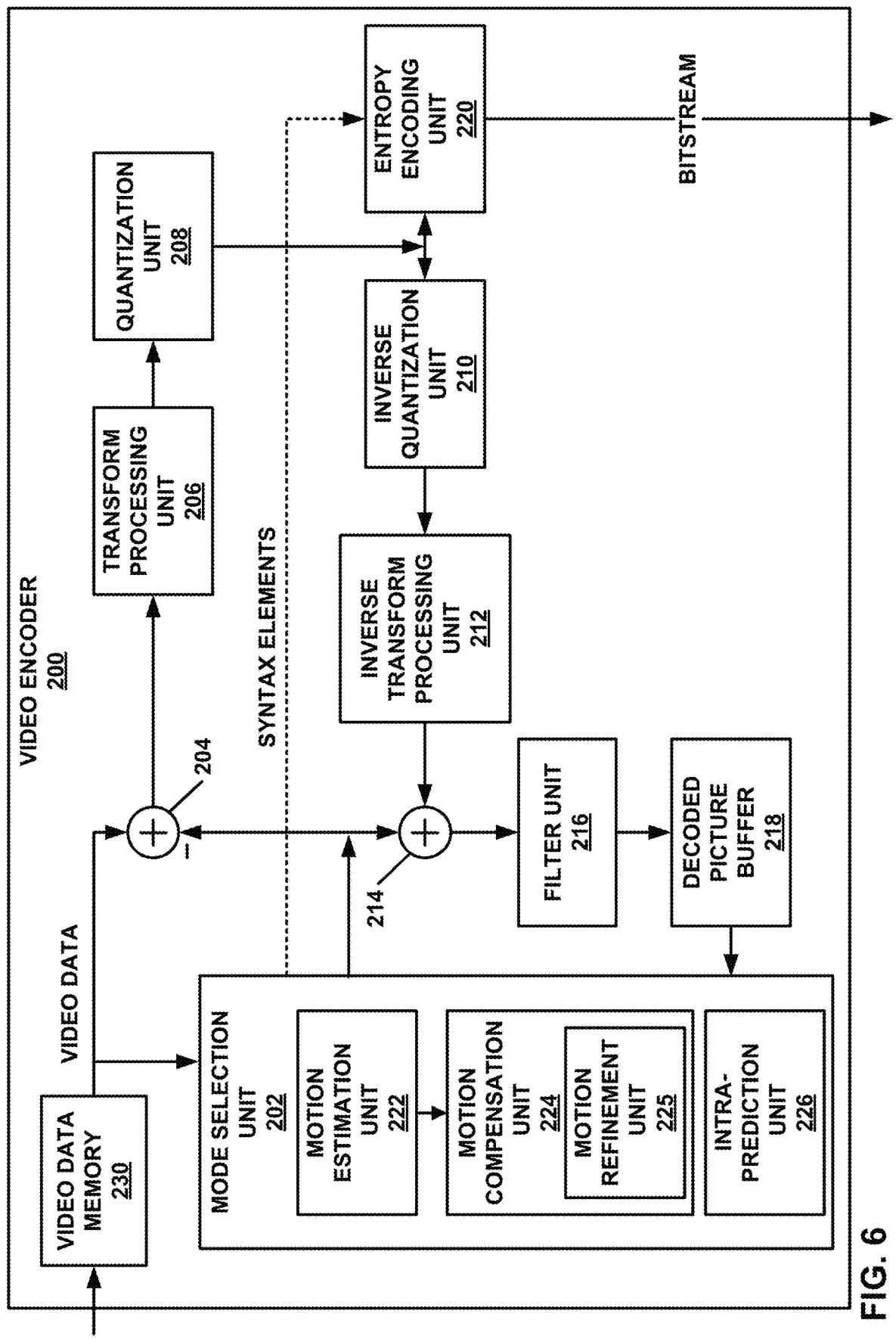
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like. In the example of FIG. 6, motion compensation unit 224 includes an motion refinement unit 225.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

Motion refinement unit 225 of motion compensation unit 224 may use a motion refinement process, such as, for example, a BDOF process and/or an DMVR process to generate a prediction block. Example of the BDOF process and the DMVR process are described elsewhere in this disclosure. Motion refinement unit 225 may check one or more early termination conditions. If one or more of the early termination conditions are not satisfied, motion refinement unit 225 may continue application of a motion vector refinement process (e.g., a BDOF process and/or a DMVR process) to generate the prediction block. Otherwise, if the early termination conditions are satisfied, motion refinement unit 225 may generate the prediction block without using the application of the motion vector refinement process (e.g., early terminate application of the motion vector refinement process). In some examples of this disclosure, one or more of the early termination conditions are modified relative to the early termination conditions set forth in VVC Draft 7. Specifically, as one example, the early termination conditions for both BDOF and DMVR apply sum of absolute difference-based (SAD-based) early termination to reduce an average-case of decoder-side complexity without considering whether the bi-directional motion vectors are symmetric (or nearly symmetric) or whether an absolute value of the bi-directional motion vectors is small (i.e., less than a threshold). Thus, in some examples, motion refinement unit 225 may perform the application of the motion vector refinement process even when the bi-directional motion vectors are symmetric (or nearly symmetric) and/or when an absolute value of the bi-directional motion vectors is small.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine bi-directional motion vectors of a current block of the video data. The one or more processing units may determine that a condition is satisfied with respect to the current block based on each component of the bi-directional motion vectors of the current block being less than a threshold value. The one or more processing units may, based on the condition being satisfied with respect to the current block, early terminate application of a motion vector refinement process to the bi-directional motion vectors of the current block. The one or more processing units may determine a prediction block for the current block based on the bi-directional motion vectors of the current block. The one or more processing units may reconstruct the current block based on the prediction block for the current block and/or generate residual data for the current block based on the prediction block for the current block.

Figure 7:
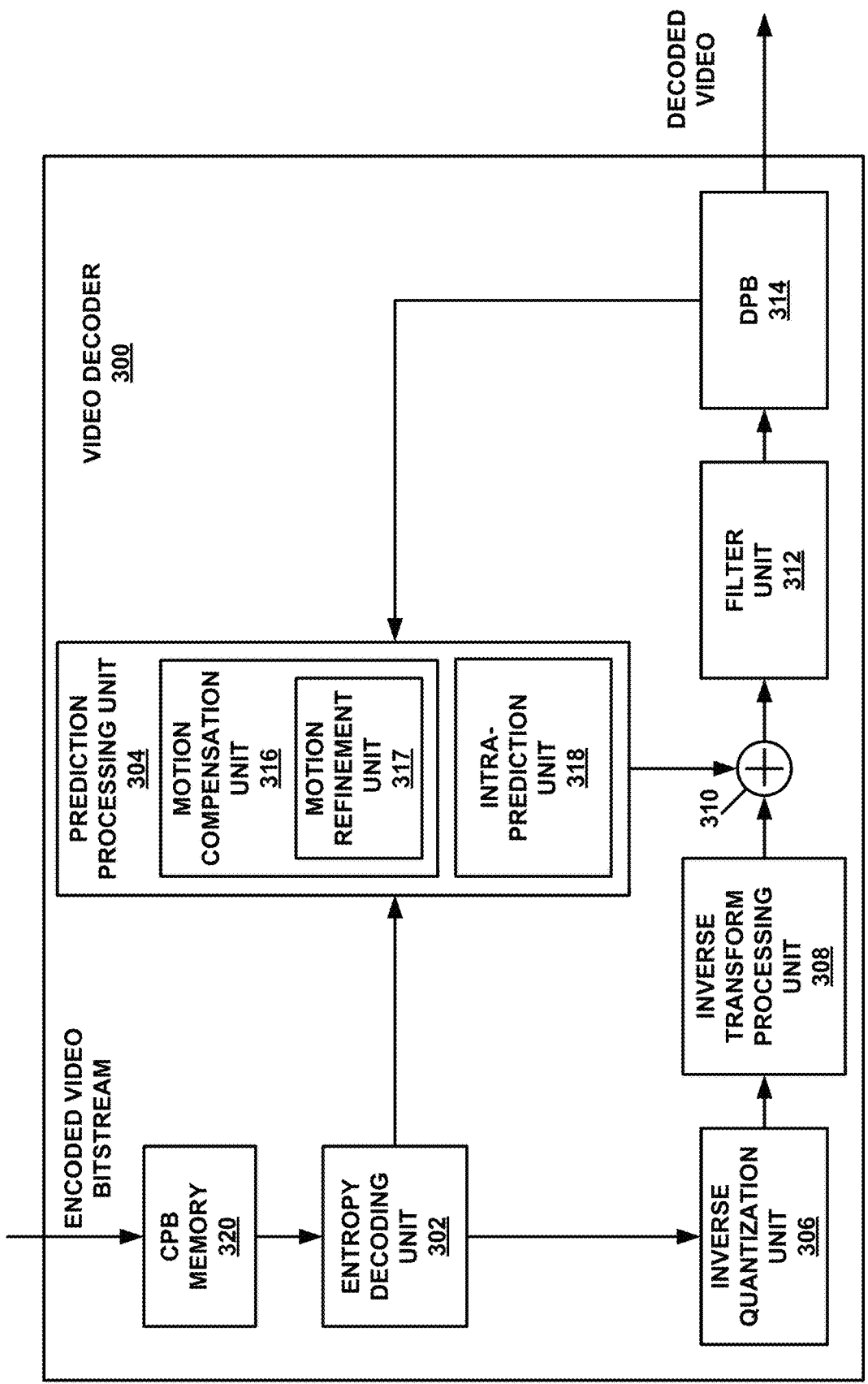
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of VVC, and HEVC. However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components. In the example of FIG. 7, motion compensation unit 316 may include an motion refinement unit 317.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

Motion refinement unit 317 of motion compensation unit 316 may use a motion refinement process, such as, for example, a BDOF process and/or an DMVR process to generate a prediction block. Example of the BDOF process and the DMVR process are described elsewhere in this disclosure. Motion refinement unit 317 may check one or more early termination conditions. If one or more of the early termination conditions are not satisfied, motion refinement unit 317 may continue application of a motion vector refinement process (e.g., a BDOF process and/or a DMVR process) to generate the prediction block. Otherwise, if the early termination conditions are satisfied, motion refinement unit 317 may generate the prediction block without using the application of the motion vector refinement process (e.g., early terminate application of the motion vector refinement process). In some examples of this disclosure, one or more of the early termination conditions are modified relative to the early termination conditions set forth in VVC Draft 7. Specifically, as one example, the early termination conditions for both BDOF and DMVR apply sum of absolute difference-based (SAD-based) early termination to reduce an average-case of decoder-side complexity without considering whether the bi-directional motion vectors are symmetric (or nearly symmetric) or whether an absolute value of the bi-directional motion vectors is small (i.e., less than a threshold). Thus, in some examples, motion refinement unit 317 may perform the application of the motion vector refinement process even when the bi-directional motion vectors are symmetric (or nearly symmetric) and/or when an absolute value of the bi-directional motion vectors is small.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine bi-directional motion vectors of a current block of the video data. The one or more processing units may determine that a condition is satisfied with respect to the current block based on each component of the bi-directional motion vectors of the current block being less than a threshold value. The one or more processing units may, based on the condition being satisfied with respect to the current block, early terminate application of a motion vector refinement process to the bi-directional motion vectors of the current block. The one or more processing units may determine a prediction block for the current block based on the bi-directional motion vectors of the current block. The one or more processing units may reconstruct the current block based on the prediction block for the current block and/or generate residual data for the current block based on the prediction block for the current block.

Figure 8:
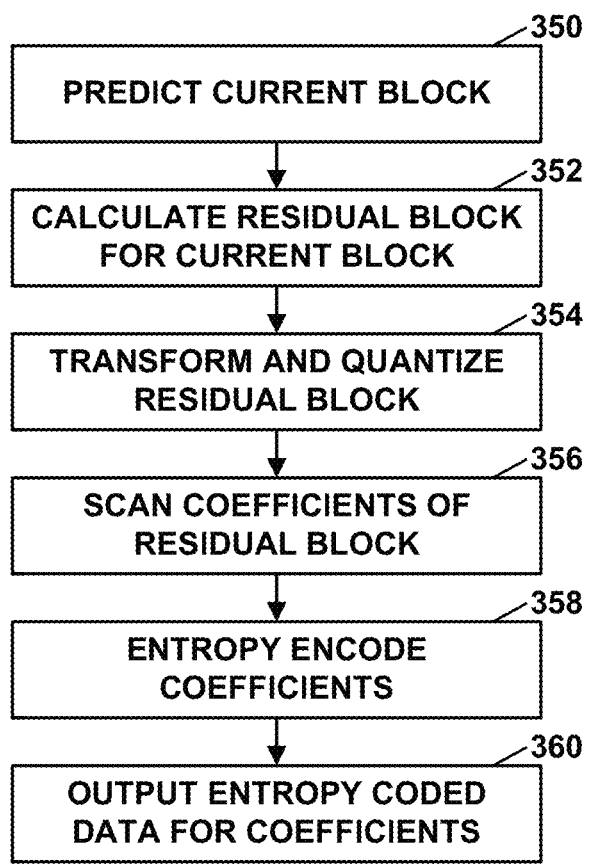
FIG. 8 is a flowchart illustrating an example method for encoding a current block that may be performed by a video encoder in accordance with one or more techniques of this disclosure.

FIG. 8 is a flowchart illustrating an example method for encoding a current block. The current block may include a current CU. Although described with respect to video encoder 200 (FIGS. 1 and 4), it should be understood that other devices may be configured to perform a method similar to that of FIG. 8.

In this example, video encoder 200 predicts the current block (350). For example, video encoder 200 may form a prediction block for the current block. As part of predicting the current block, video encoder 200 may use the techniques of this disclosure (e.g., see FIG. 10) to determine motion vectors and may then use the motion vectors to determine the prediction block for the current block. For example, video encoder 200 (e.g., motion estimation unit 222) may determine bi-directional motion vectors of a current block of the video data. Video encoder 200 (e.g., motion refinement unit 225) may determine whether a condition is satisfied with respect to the current block. For example, video encoder 200 (e.g., motion refinement unit 225) may determine that the condition is satisfied with respect to the current block based on each component of the bi-directional motion vectors of the current block being less than a threshold value. Based on the condition being satisfied with respect to the current block, video encoder 200 (e.g., motion refinement unit 225) may early terminate application of a motion vector refinement process to the bi-directional motion vectors of the current block. For example, video encoder 200 (e.g., motion compensation unit 224) may refrain from applying or bypass DMVR and/or BDOF. Video encoder 200 (e.g., motion compensation unit 224) may determine a prediction block for the current block based on the bi-directional motion vectors of the current block.

In some examples, video encoder 200 may determine a first motion vector of a current block of the video data and a second motion vector of the current block; determine a selected motion vector from among the first motion vector and the second motion vector; generate a refined version of the selected motion vector by applying a motion vector refinement process to the selected motion vector; and determine a prediction block for the current block based on the refined version of the selected motion vector and whichever of the first and second motion vectors is not the selected initial motion vector.

Video encoder 200 may then calculate a residual block for the current block (352). To calculate the residual block, video encoder 200 may calculate a difference between the original, unencoded block and the prediction block for the current block. Video encoder 200 may then transform and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 9:
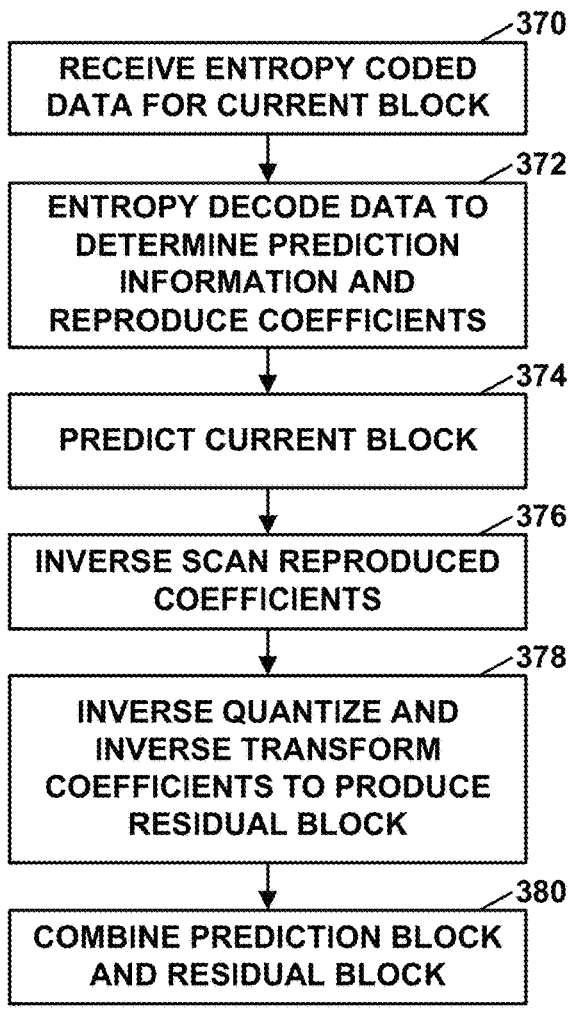
FIG. 9 is a flowchart illustrating an example method for decoding a current block of video data that may be performed by a video decoder in accordance with one or more techniques of this disclosure.

FIG. 9 is a flowchart illustrating an example method for decoding a current block of video data. The current block may include a current CU. Although described with respect to video decoder 300 (FIGS. 1 and 3), it should be understood that other devices may be configured to perform a method similar to that of FIG. 9.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372).

Video decoder 300 may predict the current block (374), e.g., using an intra- or inter-prediction mode as indicated by the prediction information for the current block, to calculate a prediction block for the current block. As part of predicting the current block, video decoder 300 may use the techniques of this disclosure (e.g., see FIG. 10) to determine motion vectors and may then use the motion vectors to determine the prediction block for the current block. For example, video decoder 300 (e.g., prediction processing unit 304) may determine bi-directional motion vectors of a current block of the video data. Video decoder 300 (e.g., motion refinement unit 317) may determine whether a condition is satisfied with respect to the current block. For example, video encoder 200 (e.g., motion refinement unit 317) may determine that the condition is satisfied with respect to the current block based on each component of the bi-directional motion vectors of the current block being less than a threshold value. Based on the condition being satisfied with respect to the current block, video decoder 300 (e.g., motion refinement unit 317) may early terminate application of a motion vector refinement process to the bi-directional motion vectors of the current block. For example, video decoder 300 (e.g., motion compensation unit 316) may refrain from applying or bypass DMVR and/or BDOF. Video decoder 300 (e.g., motion compensation unit 316) may determine a prediction block for the current block based on the bi-directional motion vectors of the current block.

In some examples, video decoder 300 may determine a first motion vector of a current block of the video data and a second motion vector of the current block; determine a selected motion vector from among the first motion vector and the second motion vector; generate a refined version of the selected motion vector by applying a motion vector refinement process to the selected motion vector; and determine a prediction block for the current block based on the refined version of the selected motion vector and whichever of the first and second motion vectors is not the selected initial motion vector.

Video decoder 300 may then inverse scan the reproduced transform coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

Figure 10:
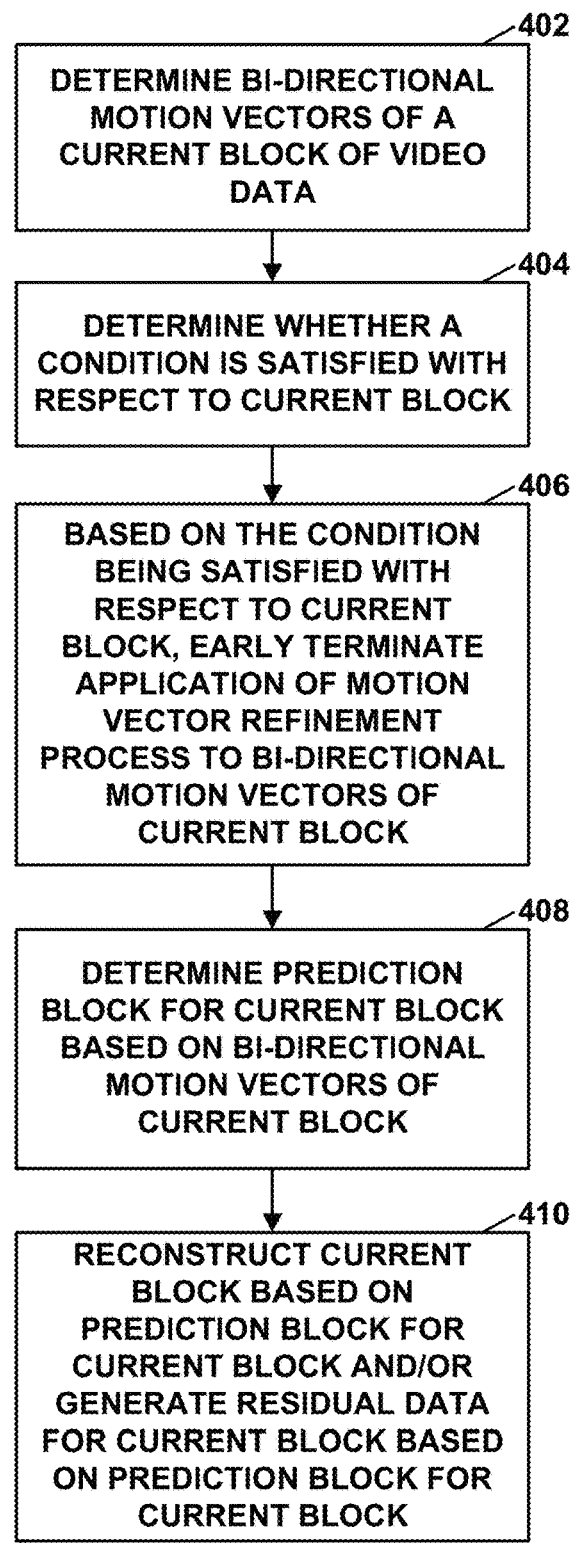
FIG. 10 is a flowchart illustrating an example method that may be performed by a video coder in accordance with one or more techniques of this disclosure.

FIG. 10 is a flowchart illustrating an example method that may be performed by a video coder in accordance with one or more techniques of this disclosure. The method of FIG. 10 may be performed by video encoder 200 or video decoder 300.

In the example of FIG. 10, a video coder (e.g., motion refinement unit 225 of video encoder 200 or motion refinement unit 317 of video decoder 300) may determine bi-directional motion vectors of a current block of the video data (402). The video coder may determine whether a condition is satisfied with respect to the current block (404). For example, the video coder may determine that the condition is satisfied with respect to the current block based on each component of the bi-directional motion vectors of the current block being less than a threshold value.

Based on the condition being satisfied with respect to the current block, a video coder (e.g., motion refinement unit 225 of video encoder 200 or motion refinement unit 317 of video decoder 300) may early terminate application of a motion vector refinement process to the bi-directional motion vectors of the current block (406). For example, the video coder may refrain from applying or bypass application of a motion vector refinement process to the bi-directional motion vectors of the current block in response to the condition being satisfied with respect to the current block.

A video coder (e.g., motion refinement unit 225 of video encoder 200 or motion refinement unit 317 of video decoder 300) may determine a prediction block for the current block based on the bi-directional motion vectors of the current block (408). For example, the video coder may determine a prediction block for the current block based on the bi-directional motion vectors of the current block with the application of the motion vector refinement process being bypassed.

A video coder (e.g., motion refinement unit 225 of video encoder 200 or motion refinement unit 317 of video decoder 300) may reconstruct the current block based on the prediction block for the current block and/or a video encoder (e.g., motion refinement unit 225 of video encoder 200) may generate residual data for the current block based on the prediction block for the current block (410).

The following is a non-limiting list of examples in accordance with one or more techniques of this disclosure.

Clause 1. A method of coding video data, the method comprising: determining bi-directional motion vectors of a current block of the video data; determining whether a condition is satisfied with respect to the current block; based on the condition being satisfied with respect to the current block, early terminating application of a motion vector refinement process to the bi-directional motion vectors of the current block; determining a prediction block for the current block based on the bi-directional motion vectors of the current block; and performing at least one of: reconstructing the current block based on the prediction block for the current block, or generating residual data for the current block based on the prediction block for the current block.

Clause 2. The method of clause 1, wherein the current block is a first block, and the method further comprises: determining bi-directional motion vectors of a second block of the video data; determining whether the condition is satisfied with respect to the second block; based on the condition not being satisfied with respect to the current block, applying the motion vector refinement process to the bi-directional motion vectors of the second block; determining a prediction block for the second block based on the refined bi-directional motion vectors of the current block; and performing at least one of: reconstructing the second block based on the prediction block for the second block, or generating residual data for the second block based on the prediction block for the second block.

Clause 3. The method of any of clauses 1-2, wherein the motion vector refinement process is a decoder-side motion vector refinement (DMVR) process.

Clause 4. The method of any of clauses 1-3, wherein the motion vector refinement process is a bi-directional optical flow (BDOF) process.

Clause 5. The method of any of clauses 1-4, wherein determining whether the condition is satisfied with respect to the current block comprises: determining that the condition is satisfied with respect to the current block based on MVL0x not being equal to $-1*$MVL1x and MVL0y not being equal to $-1*$MVL1y, where MVL0x is an x-component of a list 0 motion vector of the bi-directional motion vectors of the current block, MVL1x is an x-component of a list 1 motion vector of the bi-directional motion vectors of the current block, MVL0y is a y-component of the list 0 motion vector of the bi-directional motion vectors of the current block, and MVL1y is a y-component of the list 1 motion vector of the bi-directional motion vectors of the current block.

Clause 6. The method of any of clauses 1-5, wherein determining whether the condition is satisfied with respect to the current block comprises: determining that the condition is satisfied with respect to the current block based on MVL0x not being equal to $-1*$MVL1x or MVL0y not being equal to $-1*$MVL1y, where MVL0x is an x-component of a list 0 motion vector of the bi-directional motion vectors of the current block, MVL1x is an x-component of a list 1 motion vector of the bi-directional motion vectors of the current block, MVL0y is a y-component of the list 0 motion vector of the bi-directional motion vectors of the current block, and MVL1y is a y-component of the list 1 motion vector of the bi-directional motion vectors of the current block.

Clause 7. The method of any of clauses 1-6, wherein determining whether the condition is satisfied with respect to the current block comprises: determining that the condition is satisfied with respect to the current block based on MVL0x not being equal to $-1*(MVL1x+\Delta_x)$ and MVL0y not being equal to $-1*(MVL1y+\Delta_y)$ for all $\Delta_x$ and $\Delta_y$ ranging from $-N$ to $N$, where MVL0x is an x-component of a list 0 motion vector of the bi-directional motion vectors of the current block, MVL1x is an x-component of a list 1 motion vector of the bi-directional motion vectors of the current block, MVL0y is a y-component of the list 0 motion vector of the bi-directional motion vectors of the current block, MVL1y is a y-component of the list 1 motion vector of the bi-directional motion vectors of the current block, and N is be a sequence-, picture-, subpicture-, tile-, slice-level number signaled in a bitstream or a pre-defined constant integer number.

Clause 8. The method of any of clauses 1-7, wherein determining whether the condition is satisfied with respect to the current block comprises: determining that the condition is satisfied with respect to the current block based on MVL0x not being equal to $-1*(MVL1x+\Delta x)$ or MVL0y not being equal to $-1*(MVL1y+\Delta_y)$ for all $\Delta x$ and $\Delta_y$ ranging from $-N$ to $N$, where MVL0x is an x-component of a list 0 motion vector of the bi-directional motion vectors of the current block, MVL1x is an x-component of a list 1 motion vector of the bi-directional motion vectors of the current block, MVL0y is a y-component of the list 0 motion vector of the bi-directional motion vectors of the current block, MVL1y is a y-component of the list 1 motion vector of the bi-directional motion vectors of the current block, and N is be a sequence-, picture-, subpicture-, tile-, slice-level number signaled in a bitstream or a pre-defined constant integer number.

Clause 9. The method of any of clauses 1-8, wherein determining whether the condition is satisfied with respect to the current block comprises: determining that the condition is satisfied with respect to the current block based on p-norms of the bi-directional motion vectors of the current block being different from each other.

Clause 10. The method of any of clauses 1-9, wherein determining whether the condition is satisfied with respect to the current block comprises: determining that the condition is satisfied with respect to the current block based on a difference between p-norms of the bi-directional motion vectors of the current block being greater than a threshold.

Clause 11. The method of any of clauses 1-10, wherein determining whether the condition is satisfied with respect to the current block comprises: determining that the condition is satisfied with respect to the current block based on a difference between p-norms of the bi-directional motion vectors of the current block being less than a threshold.

Clause 12. The method of any of clauses 1-11, wherein determining whether the condition is satisfied with respect to the current block comprises: determining that the condition is satisfied with respect to the current block based on each component of the bi-directional motion vectors of the current block being less than a threshold value.

Clause 13. A method of coding video data, the method comprising: determining a first motion vector of a current block of the video data and a second motion vector of the current block; determining a selected motion vector from among the first motion vector and the second motion vector; generating a refined version of the selected motion vector by applying a motion vector refinement process to the selected motion vector; determining a prediction block for the current block based on the refined version of the selected motion vector and whichever of the first and second motion vectors is not the selected initial motion vector; and performing at least one of: reconstructing the current block based on the prediction block for the current block, or generating residual data for the current block based on the prediction block for the current block.

Clause 14. The method of clause 13, wherein the motion vector refinement process is a decoder-side motion vector refinement (DMVR) process.

Clause 15. The method of any of clauses 13-14, wherein the motion vector refinement process is a bi-directional optical flow (BDOF) process.

Clause 16. The method of any of clauses 13-15, further comprising including, in a bitstream that comprises an encoded representation of the video data, one or more syntax elements that of the first motion vector of the current block or the second motion vector of the current block is the selected motion vector.

Clause 17. The method of any of clauses 13-15, wherein determining the selected motion vector comprises determining, based on one or more syntax signaled in a bitstream that comprises an encoded representation of the video data, which one of the first motion vector of the current block or the second motion vector of the current block is the selected motion vector.

Clause 18. The method of any of clauses 13-17, wherein determining the selected motion vector comprises determining the selected motion vector based on lengths of the first motion vector of the current block and the second motion vector of the current block.

Clause 19. The method of any of clauses 13-18, wherein determining the selected motion vector comprises determining the selected motion vector based on symmetry of the first motion vector of the current block and the second motion vector of the current block.

Clause 20. The method of clause 19, wherein determining the selected motion vector comprises, based on the first motion vector of the current block and the second motion vector of the current block not being symmetric to one another, selecting whichever of the first motion vector of the current block and the second motion vector of the current block is shorter as the selected motion vector.

Clause 21. The method of any of clauses 13-20, wherein the method further comprises making a determination, based on the first motion vector of the current block and the second motion vector of the current block being symmetric, to determine the selected motion vector.

Clause 22. The method of any of clauses 13-20, determining the selected motion vector comprises making a determination, based on $MVL0 \neq -1*(MVL1+(\Delta_x,\Delta_y))$ for all $\Delta_x$ and $\Delta_y$ ranging from $-N$ to $N$, to determine the selected motion vector, where N is a sequence-, picture-, subpicture-, tile-, slice-level number signaled in a bitstream or a pre-defined constant integer number.

Clause 23. The method of any of clauses 1-22, wherein coding comprises decoding.

Clause 24. The method of any of clauses 1-22, wherein coding comprises encoding.

Clause 25. A device for coding video data, the device comprising one or more means for performing the method of any of clauses 1-22.

Clause 26. The device of clause 25, wherein the one or more means comprise one or more processors implemented in circuitry.

Clause 27. The device of any of clauses 25 and 26, further comprising a memory to store the video data.

Clause 28. The device of any of clauses 25-27, further comprising a display configured to display decoded video data.

Clause 29. The device of any of clauses 25-28, wherein the device comprises one or more of a camera, a computer, a mobile device, a broadcast receiver device, or a set-top box.

Clause 30. The device of any of clauses 25-29, wherein the device comprises a video decoder.

Clause 31. The device of any of clauses 25-30, wherein the device comprises a video encoder.

Clause 32. A computer-readable storage medium having stored thereon instructions that, when executed, cause one or more processors to perform the method of any of clauses 1-22.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining bi-directional motion vectors of a current block of the video data;
    determining that a condition is satisfied with respect to the current block based on MVL0x not being equal to −1*MVL1x or MVL0y not being equal to −1*MVL1y, wherein MVL0x is an x-component of a list 0 motion vector of the bi-directional motion vectors of the current block, MVL1x is an x-component of a list 1 motion vector of the bi-directional motion vectors of the current block, MVL0y is a y-component of the list 0 motion vector of the bi-directional motion vectors of the current block, and MVL1y is a y-component of the list 1 motion vector of the bi-directional motion vectors of the current block,
    based on the condition being satisfied with respect to the current block, early terminating application of a motion vector refinement process to the bi-directional motion vectors of the current block;
    determining a prediction block for the current block based on the bi-directional motion vectors of the current block; and
    reconstructing the current block based on the prediction block for the current block.

2. The method of claim 1, further comprising:
    determining second bi-directional motion vectors of a second block of the video data;
    determining that a second condition is satisfied with respect to the second block based on an absolute value of each of an x-component and a y-component of each of the second bi-directional motion vectors of the second block being less than a threshold value, and
    based on the second condition being satisfied with respect to the second block, early terminating application of the motion vector refinement process to the second bi-directional motion vectors of the second block.

3. The method of claim 1, wherein the motion vector refinement process is a decoder-side motion vector refinement (DMVR) process.

4. The method of claim 1, wherein the motion vector refinement process is a bi-directional optical flow (BDOF) process.

5. The method of claim 1, further comprising:
    determining second bi-directional motion vectors of a second block of the video data;
    determining that a second condition is satisfied with respect to the second block based on MVL0x not being equal to −1*MVL1x and MVL0y not being equal to −1*MVL1y, wherein MVL0x is an x-component of a list 0 motion vector of the second bi-directional motion vectors of the second block, MVL1x is an x-component of a list 1 motion vector of the second bi-directional motion vectors of the second block, MVL0y is a y-component of the list 0 motion vector of the second bi-directional motion vectors of the second block, and MVL1y is a y-component of the list 1 motion vector of the second bi-directional motion vectors of the second block, and
    based on the second condition being satisfied with respect to the second block, early terminating application of the motion vector refinement process to the second bi-directional motion vectors of the second block.

6. The method of claim 1, further comprising:
    determining second bi-directional motion vectors of a second block of the video data;
    determining that a second condition is satisfied with respect to the second block based on MVL0x not being equal to −1*(MVL1x+$\Delta_x$) and MVL0y not being equal to −1*(MVL1y+$\Delta_y$) for all $\Delta_x$ and $\Delta_y$ ranging from −N to N, wherein MVL0x is an x-component of a list 0 motion vector of the second bi-directional motion vectors of the second block, MVL1x is an x-component of a list 1 motion vector of the second bi-directional motion vectors of the second block, MVL0y is a y-component of the list 0 motion vector of the second bi-directional motion vectors of the second block, MVL1y is a y-component of the list 1 motion vector of the second bi-directional motion vectors of the second block, and N is a sequence-, picture-, subpicture-, tile-, slice-level number signaled in a bitstream or a predefined constant integer number, and
    based on the second condition being satisfied with respect to the second block, early terminating application of the motion vector refinement process to the second bi-directional motion vectors of the second block.

7. The method of claim 1, further comprising:
    determining second bi-directional motion vectors of a second block of the video data;
    determining that a second condition is satisfied with respect to the second block based on MVL0x not being equal to −1*(MVL1x+$\Delta_x$) or MVL0y not being equal to −1*(MVL1y+$\Delta_y$) for all $\Delta_x$ and $\Delta_y$ ranging from −N to N, wherein MVL0x is an x-component of a list 0 motion vector of the second bi-directional motion vectors of the second block, MVL1x is an x-component of a list 1 motion vector of the second bi-directional motion vectors of the second block, MVL0y is a y-component of the list 0 motion vector of the second bi-directional motion vectors of the second block, MVL1y is a y-component of the list 1 motion vector of the second bi-directional motion vectors of the second block, and N is a sequence-, picture-, subpicture-, tile-, slice-level number signaled in a bitstream or a predefined constant integer number, and based on the second condition being satisfied with respect to the second block, early terminating application of the motion vector refinement process to the second bi-directional motion vectors of the second block.

8. The method of claim 1, further comprising:

determining second bi-directional motion vectors of a second block of the video data;

determining that a second condition is satisfied with respect to the second block based on a length of the second bi-directional motion vectors of the second block being different from each other, and based on the second condition being satisfied with respect to the second block, early terminating application of the motion vector refinement process to the second bi-directional motion vectors of the second block.

9. The method of claim 1, further comprising:

determining second bi-directional motion vectors of a second block of the video data;

determining that a second condition is satisfied with respect to the second block based on a difference between a length of the second bi-directional motion vectors of the second block being greater than a threshold value, and based on the second condition being satisfied with respect to the second block, early terminating application of the motion vector refinement process to the second bi-directional motion vectors of the second block.

10. The method of claim 1, further comprising:

determining second bi-directional motion vectors of a second block of the video data;

determining that a second condition is satisfied with respect to the second block based on a difference between a length of the second bi-directional motion vectors of the second block being less than a threshold value, and based on the second condition being satisfied with respect to the second block, early terminating application of the motion vector refinement process to the second bi-directional motion vectors of the second block.

11. The method of claim 1, further comprising generating residual data for the block based on the prediction block for the block.

12. A device comprising:

a memory configured to store video data; and one or more processors implemented in circuitry and configured to:

determine bi-directional motion vectors of a current block of the video data;

determine that a condition is satisfied with respect to the current block based on MVL0x not being equal to −1*MVL1x or MVL0y not being equal to −1*MVL1y, wherein MVL0x is an x-component of a list 0 motion vector of the bi-directional motion vectors of the current block, MVL1x is an x-component of a list 1 motion vector of the bi-directional motion vectors of the block, MVL0y is a y-component of the list 0 motion vector of the bi-directional motion vectors of the current block, and MVL1y is a y-component of the list 1 motion vector of the bi-directional motion vectors of the current block, based on the condition being satisfied with respect to the current block, early terminate application of a motion vector refinement process to the bi-directional motion vectors of the current block;

determine a prediction block for the current block based on the bi-directional motion vectors of the current block; and reconstruct the current block based on the prediction block for the current block.

13. The device of claim 12, wherein the one or more processors are configured to:

determine second bi-directional motion vectors of a second block of the video data;

determine that a second condition is satisfied with respect to the second block based on an absolute value of each of an x-component and a y-component of each of the second bi-directional motion vectors of the second block being less than a threshold value, and based on the second condition being satisfied with respect to the second block, early terminate application of the motion vector refinement process to the second bi-directional motion vectors of the second block.

14. The device of claim 12, wherein the motion vector refinement process is a decoder-side motion vector refinement (DMVR) process.

15. The device of claim 12, wherein the motion vector refinement process is a bi-directional optical flow (BDOF) process.

16. The device of claim 12, wherein the one or more processors are further configured to:

determine second bi-directional motion vectors of a second block of the video data;

determine that a second condition is satisfied with respect to the second block based on MVL0x not being equal to −1*MVL1x and MVL0y not being equal to −1*MVL1y, wherein MVL0x is an x-component of a list 0 motion vector of the second bi-directional motion vectors of the second block, MVL1x is an x-component of a list 1 motion vector of the second bi-directional motion vectors of the second block, MVL0y is a y-component of the list 0 motion vector of the second bi-directional motion vectors of the second block, and MVL1y is a y-component of the list 1 motion vector of the second bi-directional motion vectors of the second block, and based on the second condition being satisfied with respect to the second block, early terminate application of the motion vector refinement process to the second bi-directional motion vectors of the second block.

17. The device of claim 12, wherein the one or more processors are further configured to:

determine second bi-directional motion vectors of a second block of the video data;

determine that a second condition is satisfied with respect to the second block based on MVL0x not being equal to $-1*(MVL1x+\Delta_x)$ and MVL0y not being equal to $-1*(MVL1y+\Delta_y)$ for all $\Delta_x$ and $\Delta_y$ ranging from −N to N, wherein MVL0x is an x-component of a list 0 motion vector of the second bi-directional motion vectors of the second block, MVL1x is an x-component of a list 1 motion vector of the second bi-directional motion vectors of the second block, MVL0y is a y-component of the list 0 motion vector of the second bi-directional motion vectors of the second block, MVL1y is a y-component of the list 1 motion vector of the second bi-directional motion vectors of the second block, and N is a sequence-, picture-, subpicture-, tile-, slice-level number signaled in a bitstream or a pre-defined constant integer number, and based on the second condition being satisfied with respect to the second block, early terminate application of the motion vector refinement process to the second bi-directional motion vectors of the second block.

18. The device of claim 12, wherein the one or more processors are further configured to:
   determine second bi-directional motion vectors of a second block of the video data;
   determine that a second condition is satisfied with respect to the second block based on MVL0x not being equal to $-1*(MVL1x+\Delta_x)$ or MVL0y not being equal to $-1*(MVL1y+\Delta_y)$ for all $\Delta_x$ and $\Delta_y$ ranging from $-N$ to $N$, wherein MVL0x is an x-component of a list 0 motion vector of the second bi-directional motion vectors of the second block, MVL1x is an x-component of a list 1 motion vector of the second bi-directional motion vectors of the second block, MVL0y is a y-component of the list 0 motion vector of the second bi-directional motion vectors of the second block, MVL1y is a y-component of the list 1 motion vector of the second bi-directional motion vectors of the second block, and N is a sequence-, picture-, subpicture-, tile-, slice-level number signaled in a bitstream or a pre-defined constant integer number, and
   based on the second condition being satisfied with respect to the second block, early terminate application of the motion vector refinement process to the second bi-directional motion vectors of the second block.

19. The device of claim 12, wherein the one or more processors are further configured to:
   determine second bi-directional motion vectors of a second block of the video data;
   determine that a second condition is satisfied with respect to the second block based on a length of the second bi-directional motion vectors of the second block being different from each other, and
   based on the second condition being satisfied with respect to the second block, early terminate application of the motion vector refinement process to the second bi-directional motion vectors of the second block.

20. The device of claim 12, wherein the one or more processors are further configured to:
   determine second bi-directional motion vectors of a second block of the video data;
   determine that a second condition is satisfied with respect to the second block based on a difference between a length of the second bi-directional motion vectors of the second block being greater than a threshold value, and
   based on the second condition being satisfied with respect to the second block, early terminating application of the motion vector refinement process to the second bi-directional motion vectors of the second block.

21. The device of claim 12, wherein the one or more processors are further configured to:
   determine second bi-directional motion vectors of a second block of the video data;
   determine that a second condition is satisfied with respect to the second block based on a difference between a length of the second bi-directional motion vectors of the second block being less than a threshold value, and
   based on the second condition being satisfied with respect to the second block, early terminating application of the motion vector refinement process to the second bi-directional motion vectors of the second block.

22. The device of claim 12, wherein the one or more processors are configured to generate residual data for the current block based on the prediction block for the current block.

23. The device of claim 12, further comprising a display configured to display the video data.

24. The device of claim 12, wherein the device comprises one or more of a camera, a computer, a mobile device, a broadcast receiver device, a set-top box, an integrated circuit, a microprocessor, or a wireless communication device.

25. The device of claim 12, further comprising a camera configured to capture the video data.

26. A non-transitory computer-readable storage medium having stored thereon instructions that, when executed, cause a processor to:
   determine bi-directional motion vectors of a current block of video data;
   determine that a condition is satisfied with respect to the current block based on MVL0x not being equal to $-1*MVL1x$ or MVL0y not being equal to $-1*MVL1y$, wherein MVL0x is an x-component of a list 0 motion vector of the bi-directional motion vectors of the current block, MVL1x is an x-component of a list 1 motion vector of the bi-directional motion vectors of the current block, MVL0y is a y-component of the list 0 motion vector of the bi-directional motion vectors of the current block, and MVL1y is a y-component of the list 1 motion vector of the bi-directional motion vectors of the current block,
   based on the condition being satisfied with respect to the current block, early terminate application of a motion vector refinement process to the bi-directional motion vectors of the current block;
   determine a prediction block for the current block based on the bi-directional motion vectors of the current block; and
   reconstruct the current block based on the prediction block for the current block.

* * * * *